US010437301B2

(12) United States Patent
Jahagirdar et al.

(10) Patent No.: US 10,437,301 B2
(45) Date of Patent: Oct. 8, 2019

(54) DYNAMIC ENERGY STORAGE DEVICE DISCHARGING

(71) Applicant: Microsoft Technology Licensing, LLC, Redmond, WA (US)

(72) Inventors: Aniruddha Jayant Jahagirdar, Bellevue, WA (US); Ranveer Chandra, Kirkland, WA (US); Anirudh Badam, Issaquah, WA (US); James Anthony Schwartz, Jr., Seattle, WA (US); Paresh Maisuria, Issaquah, WA (US); Matthew Holle, Kirkland, WA (US); M. Nashaat Soliman, Redmond, WA (US); Murtuza S. Naguthanawala, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 15/353,596

(22) Filed: Nov. 16, 2016

(65) Prior Publication Data
US 2018/0136704 A1    May 17, 2018

(51) Int. Cl.
*G06F 1/32*    (2019.01)
*G06F 1/26*    (2006.01)
(Continued)

(52) U.S. Cl.
CPC .............. *G06F 1/263* (2013.01); *G06F 1/206* (2013.01); *G06F 1/26* (2013.01); *G06F 1/3203* (2013.01); *G06F 1/3212* (2013.01)

(58) Field of Classification Search
CPC ................. G06F 1/32; G06F 1/26; G06F 1/00
(Continued)

(56) References Cited

U.S. PATENT DOCUMENTS 4,743,831 A    5/1988  Young
5,270,946 A    12/1993 Shibasaki et al.
(Continued)

FOREIGN PATENT DOCUMENTS

CN    102185164    9/2011
CN    10379304     5/2014
(Continued)

OTHER PUBLICATIONS

Jiang, et al., "Synergetic Control of Power Converters for Pulse Current Charging of Advanced Batteries From a Fuel Cell Power Source", In Journal of IEEE Transactions on Power Electronics, vol. 19, Issue 4, Jul. 2004, pp. 1140-1150.
(Continued)

*Primary Examiner* — Jaweed A Abbaszadeh
*Assistant Examiner* — Keshab R Pandey

(57) ABSTRACT

A computing device has an energy storage device system with multiple energy storage devices. Various different criteria are used to determine which one or more of the multiple energy storage devices to discharge at any given time to provide power to the computing device. The criteria can include characteristics of the energy storage devices as well as hardware and/or physical characteristics of the computing device, characteristics of the energy storage devices and/or the computing device that change while the computing device operates, and predicted behavior or usage of the computing device. These criteria are evaluated during operation of the computing device, and the appropriate energy storage device(s) from which to draw power at any given time based on these criteria are determined.

20 Claims, 6 Drawing Sheets

(51) Int. Cl.
*G06F 1/3212* (2019.01)
*G06F 1/20* (2006.01)
*G06F 1/3203* (2019.01)

(58) Field of Classification Search
USPC ..... 713/300, 310, 320, 321, 322, 3, 23, 324, 713/340, 375
See application file for complete search history.

(56) References Cited

U.S. PATENT DOCUMENTS

| | | | |
|---|---|---|---|
| 5,371,682 A | 12/1994 | Levine et al. | |
| 5,565,759 A | 10/1996 | Dunstan | |
| 5,757,163 A | 5/1998 | Brotto et al. | |
| 6,225,780 B1 | 5/2001 | Koch | |
| 6,288,521 B1 | 9/2001 | Meador | |
| 6,289,399 B1 | 9/2001 | Furuichi et al. | |
| 6,870,349 B2 | 3/2005 | Cook | |
| 7,505,795 B1 | 3/2009 | Lim et al. | |
| 7,663,344 B2 | 2/2010 | Le Gall et al. | |
| RE41,676 E | 9/2010 | Yau et al. | |
| 7,853,735 B2 | 12/2010 | Jin et al. | |
| 7,915,860 B2 | 3/2011 | Quint et al. | |
| 7,960,945 B1 | 6/2011 | Onorato et al. | |
| 8,054,962 B2 | 11/2011 | Anglin et al. | |
| 8,120,321 B2 | 2/2012 | Vezzini et al. | |
| 8,126,517 B2 | 2/2012 | Ashbrook et al. | |
| 8,135,443 B2 | 3/2012 | Aleksic et al. | |
| 8,179,095 B1 | 5/2012 | Onorato et al. | |
| 8,237,411 B2 | 8/2012 | Liu et al. | |
| 8,250,384 B2 | 8/2012 | Aleksic et al. | |
| 8,452,353 B2 | 5/2013 | Crawford | |
| 8,581,548 B2 | 11/2013 | Goff et al. | |
| 8,599,840 B2 | 12/2013 | Albert et al. | |
| 8,665,214 B2 | 3/2014 | Albert et al. | |
| 8,751,845 B2 | 6/2014 | Assad et al. | |
| 8,798,685 B2 | 8/2014 | Stekkelpak et al. | |
| 8,813,177 B2 | 8/2014 | Srour et al. | |
| 8,872,481 B2 | 10/2014 | Chawla et al. | |
| 8,917,061 B2 | 12/2014 | Zhu | |
| 8,996,113 B2 | 3/2015 | Ries et al. | |
| 9,009,502 B2 | 4/2015 | Udeshi et al. | |
| 9,043,085 B2 | 5/2015 | Sisk | |
| 9,058,128 B1 | 6/2015 | Robison et al. | |
| 9,070,273 B2 | 6/2015 | Robison et al. | |
| 9,152,202 B2 | 10/2015 | Seinfeld et al. | |
| 9,189,055 B2 | 11/2015 | Yang et al. | |
| 9,210,662 B1 | 12/2015 | Brown et al. | |
| 9,377,839 B2 | 6/2016 | Sasidharan et al. | |
| 9,385,557 B2 | 7/2016 | Causey et al. | |
| 9,430,280 B1 | 8/2016 | Shih et al. | |
| 9,431,828 B2 | 8/2016 | Besser et al. | |
| 2003/0042741 A1 | 3/2003 | Hartman et al. | |
| 2007/0083781 A1 | 4/2007 | Aoyagi | |
| 2008/0055311 A1 | 3/2008 | Aleksic et al. | |
| 2008/0201587 A1 | 8/2008 | Lee | |
| 2009/0088991 A1 | 4/2009 | Brzezowski et al. | |
| 2009/0249095 A1 | 10/2009 | Poornachandran et al. | |
| 2010/0211804 A1 | 8/2010 | Brumley et al. | |
| 2010/0287559 A1 | 11/2010 | Mergen | |
| 2010/0304251 A1 | 12/2010 | Chan et al. | |
| 2011/0047552 A1 | 2/2011 | Mergen et al. | |
| 2011/0159931 A1 | 6/2011 | Boss et al. | |
| 2011/0166810 A1 | 7/2011 | Grider et al. | |
| 2011/0288898 A1 | 11/2011 | Roe | |
| 2012/0072752 A1 | 3/2012 | Kennedy et al. | |
| 2012/0210150 A1 | 8/2012 | de lind van wijngaarden et al. | |
| 2012/0210325 A1 | 8/2012 | de Lind van Wijngaarden et al. | |
| 2012/0254634 A1 | 10/2012 | Chakra et al. | |
| 2012/0260118 A1 | 10/2012 | Jiang et al. | |
| 2012/0274279 A1* | 11/2012 | Banos .................. H02J 7/0021 320/112 | |
| 2012/0274641 A1 | 11/2012 | Diard | |
| 2012/0299554 A1 | 11/2012 | Kruglick | |
| 2012/0317432 A1 | 12/2012 | Assad et al. | |
| 2013/0176000 A1 | 7/2013 | Bishop et al. | |
| 2013/0191662 A1 | 7/2013 | Ingrassia et al. | |
| 2013/0231894 A1 | 9/2013 | Paakkonen et al. | |
| 2013/0257382 A1 | 10/2013 | Field et al. | |
| 2013/0300374 A1* | 11/2013 | Tomita ................ H01M 10/441 320/134 | |
| 2014/0042977 A1* | 2/2014 | Kim ...................... H02J 7/0068 320/134 | |
| 2014/0045436 A1 | 2/2014 | Gutierrez, Jr. | |
| 2014/0136799 A1 | 5/2014 | Fortin | |
| 2014/0195066 A1 | 7/2014 | Nanda et al. | |
| 2014/0210265 A1* | 7/2014 | Thorsoe ................ H02J 7/0011 307/23 | |
| 2014/0281645 A1 | 9/2014 | Sen et al. | |
| 2014/0331068 A1 | 11/2014 | Cao | |
| 2014/0356656 A1 | 12/2014 | Chen et al. | |
| 2015/0048796 A1 | 2/2015 | Sherstyuk et al. | |
| 2015/0212560 A1 | 7/2015 | Ueda | |
| 2015/0227445 A1 | 8/2015 | Arscott et al. | |
| 2015/0277454 A1 | 10/2015 | Carbone et al. | |
| 2015/0293575 A1 | 10/2015 | Hampson et al. | |
| 2015/0323974 A1 | 11/2015 | Shuster et al. | |
| 2015/0347204 A1 | 12/2015 | Stanley-Marbell et al. | |
| 2015/0351037 A1 | 12/2015 | Brown et al. | |
| 2015/0357842 A1 | 12/2015 | Bailly et al. | |
| 2016/0034022 A1 | 2/2016 | Sutardja et al. | |
| 2016/0073351 A1 | 3/2016 | Cardozo et al. | |
| 2016/0077562 A1 | 3/2016 | Smith | |
| 2016/0209906 A1 | 7/2016 | Chae et al. | |
| 2016/0210174 A1 | 7/2016 | Hsieh et al. | |
| 2016/0224648 A1 | 8/2016 | Le | |
| 2016/0242119 A1 | 8/2016 | Shedletsky et al. | |
| 2016/0248266 A1 | 8/2016 | Ferrese et al. | |
| 2017/0133867 A1* | 5/2017 | Banos .................. H02J 7/0021 | |
| 2017/0346303 A1 | 11/2017 | Vanblon et al. | |
| 2017/0371394 A1 | 12/2017 | Chan et al. | |
| 2018/0123358 A1 | 5/2018 | Prabhakar et al. | |
| 2018/0136704 A1 | 5/2018 | Jahagirdar et al. | |
| 2018/0136708 A1 | 5/2018 | Jahagirdar et al. | |
| 2018/0136709 A1 | 5/2018 | Jahagirdar et al. | |
| 2018/0267839 A1 | 9/2018 | Maisuria et al. | |

FOREIGN PATENT DOCUMENTS

| | | |
|---|---|---|
| EP | 0727728 | 8/1996 |
| JP | 2015100236 A | 5/2015 |
| KR | 20110084768 | 7/2011 |
| KR | 101521585 | 5/2015 |
| WO | 9305560 A1 | 3/1993 |
| WO | WO-2006126022 | 11/2006 |
| WO | 2009128079 A1 | 10/2009 |
| WO | WO-2014039311 | 3/2014 |
| WO | WO-2016032908 | 3/2016 |
| WO | 2016133687 A1 | 8/2016 |
| WO | 2016133688 A1 | 8/2016 |
| WO | 2016160748 A1 | 10/2016 |

OTHER PUBLICATIONS

"International Search Report and Written opinion Issued in PCT Application No. PCT/US2017/060734", dated Apr. 3, 2018, 12 Pages.

"International Search Report and Written Opinion Issued in PCT Application No. PCT/US2017/060736", dated Apr. 18, 2018, 25 Pages.

Yin, et al., "Pulse-Based Fast Battery IoT Charger Using Dynamic Frequency and Duty Control Techniques Based on Multi-Sensing of Polarization Curve", In Journal of Energies, vol. 9, Issue 3, Mar. 17, 2016, 20 pages.

"Invitation to Pay additional Fee Issued in PCT Application No. PCT/US17/060736", dated Feb. 16, 2018, 17 Pages.

"International Search Report and Written Opinion Issued in PCT Application No. PCT/US2018/022083", dated Jun. 13, 2018, 17 Pages.

"International Search Report and Written Opinion Issued in PCT Application No. PCT/US2017/060733", dated Apr. 25, 2018, 12 Pages.

(56) References Cited

OTHER PUBLICATIONS

"Greenify", https://play.google.com/store/apps/details?id=com.oasisfeng.greenify, Oct. 9, 2016, 5 pages.

"GSam Battery Monitor", https://play.google.com/store/apps/details?id=com.gsamlabs.bbm&hl=en, Jul. 11, 2016, 6 pages.

"Watchdog Task Manager Lite", https://play.google.com/store/apps/details?id=com.zomut.watchdoglite, Feb. 5, 2012, 5 pages.

Hoffman,"How to See Which Apps Are Draining Your Battery on an Android Phone or Tablet", http://www.howtogeek.com/244748/how-to-see-which-apps-are-draining-your-battery-on-an-android-phone-or-tablet/, Mar. 15, 2016, 6 pages.

Kannan,"Limit Battery Drain on Lollipop by Limiting Background Processes & Killing Apps Activities", http://techtrickz.com/how-to/limit-battery-drain-on-lollipop-by-limiting-background-processes-killing-apps-activities/, Aug. 13, 2015, 7 pages.

Rong,"An Analytical Model for Predicting the Remaining Battery Capacity Prediction for Lithium-Ion Batteries", In Proceedings of the conference on Design, Automation and Test in Europe—vol. 1, Mar. 2003, 2 pages.

Yuan,"GRACE-1: Cross-Layer Adaptation for Multimedia Quality and Battery Energy", In Journal of IEEE Transactions on Mobile Computing, vol. 5, No. 7, Jul. 2006, pp. 799-815.

Badam, et al., "Software Defined Batteries", In Proceedings of the 25th Symposium on Operating Systems Principles, Oct. 4, 2015, pp. 1-15.

"Dual Smart Battery System Manager", http://cds.linear.com/docs/en/datasheet/1760fb.pdf, Retrieved on: Oct. 19, 2016, pp. 1-48.

Gurries, Mark, "Monolithic Dual Battery Power Manager Increases Run Time and Decreases Charge Time", In Linear Technology Magazine, Dec. 2001, 6 pages.

Weinberger, Matt, "Microsoft has a crazy plan to make your batteries last a lot longer", http://www.businessinsider.com.au/microsoft-research-multiple-batteries-for-a-laptop-project-2015-10?r=US&IR=T,Published on: Oct. 5, 2015, 9 pages.

"Non Final Office Action Issued in U.S. Appl. No. 15/340,790", dated Nov. 2, 2018, 16 Pages.

"Non Final Office Action Issued in U.S. Appl. No. 15/353,581", dated Sep. 14, 2018, 21 Pages.

"Non Final Office Action Issued in U.S. Appl. No. 15/463,918", dated Sep. 21, 2018, 28 Pages.

"International Search Report and Written Opinion Issued in PCT Application No. PCT/US18/033582", dated Aug. 20, 2018, 17 Pages.

"Final Office Action Issued in U.S. Appl. No. 15/463,918", dated Apr. 19, 2019, 35 Pages.

"Non Final Office Action Issued in U.S. Appl. No. 15/633,514", dated Mar. 5, 2019, 24 Pages.

"Applicant-Initiated Interview Summary Issued in U.S. Appl. No. 15/340,790", dated Jan. 31, 2019, 3 Pages.

Non-Final Office Action Issued in U.S. Appl. No. 15/353,548, dated Jan. 7, 2019, 14 Pages.

* cited by examiner

DYNAMIC ENERGY STORAGE DEVICE DISCHARGING

BACKGROUND

As technology has advanced, mobile computing devices have become increasingly commonplace. Mobile computing devices provide various functionality to users, allowing the user to interact with the device to check email, surf the web, compose text messages, interact with applications, and so on. One challenge that faces developers of mobile computing devices is efficient power management and extension of battery life. If power management implemented for a device fails to provide a good battery life, user dissatisfaction with the device and manufacturer may result.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects in a computing device having multiple energy storage devices, a temperature for each of multiple thermal zones of the computing device is determined. Based on multiple criteria regarding operation of the computing device, one or more of the multiple energy storage devices to draw power from is determined, the multiple criteria including the temperature of each of the one or more thermal zones. Each of the one or more of the multiple energy storage devices is configured to provide power to the computing device.

In accordance with one or more aspects in a computing device having multiple energy storage devices, values for multiple criteria regarding the computing device are determined. The multiple criteria include hardware characteristics of the computing device, the hardware characteristics of the computing device including proximity of each of the multiple energy storage devices to a component of the computing device. Based on the multiple criteria, one or more of the multiple energy storage devices to draw power from is determined, the determining the one or more energy storage devices including identifying one of the multiple energy storage devices that is closest to the component. Each of the one or more of the multiple energy storage devices is configured to provide power to the computing device, the configuring including configuring the one of the multiple energy storage devices that is closest to the component to provide power to the component.

In accordance with one or more aspects, a computing device includes an energy storage device system including multiple energy storage devices, and an energy storage device discharge selection system configured to communicate, to the energy storage device system, an indication of which of the multiple energy storage devices to draw power from. The energy storage device discharge selection system includes a static criteria determination module, a dynamic system criteria determination module, and an energy storage device selection module. The static criteria determination module configured to determine values for characteristics of the multiple energy storage devices and physical characteristics of the computing device. The dynamic system criteria determination module configured to determine values for characteristics of the energy storage devices and/or the computing device that change while the computing device operates, including temperatures of one or more thermal zones in the computing device. The energy storage device selection module configured to select, based on the values determined by the static criteria determination module and the dynamic system criteria determination module, which of the multiple energy storage devices to draw power from.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion

DETAILED DESCRIPTION

Overview

Figure 1:
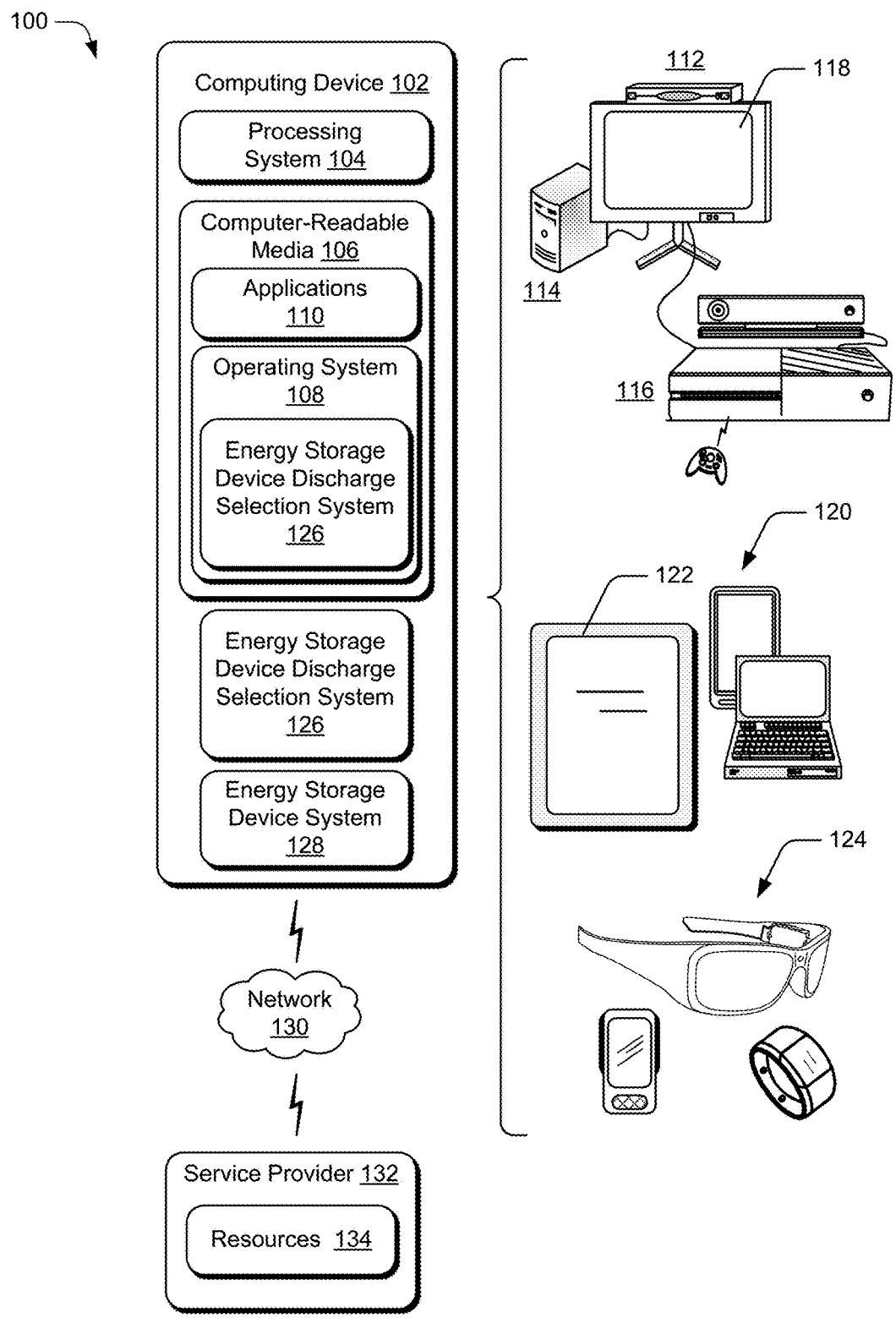
FIG. 1 illustrates an operating environment in accordance with one or more embodiments.

Dynamic energy storage device discharging is described for a computing device having an energy storage device system with multiple energy storage devices. These multiple energy storage devices can be the same types of energy storage devices or alternatively different types of energy storage devices having various different characteristics such as different sizes, capacities, technologies, chemistries, shapes, age, cycles, temperature, and so forth. Various different criteria are used to determine which one or more of the multiple energy storage devices to discharge at any given time to provide power to the computing device.

The criteria used to determine which one or more of the multiple energy storage devices to discharge at any given time to provide power to the computing device include static criteria, dynamic system criteria, and prediction criteria. The static criteria refers to characteristics of the energy storage devices as well as hardware and/or physical characteristics of the computing device that do not change while the computing device operates (e.g., while executing different programs). The dynamic system criteria refers to characteristics of the energy storage devices and/or the computing device that changes while the computing device operates (e.g., while executing different programs). The prediction criteria refers to estimated or predicted user behavior (e.g., predicting the intent of the user), program behavior (e.g., predicting how the software installed is using/causing usage of the system, such as an antivirus service), and/or more general usage of the computing device, such as removal or insertion of hot-swappable batteries, connection to an AC power source, workload and/or power usage of the computing device, and so forth.

These criteria are evaluated during operation of the computing device, and the appropriate energy storage device(s) from which to draw power at any given time based on these criteria are determined. The techniques discussed herein allow power to be drawn from the multiple energy storage devices for the computing device in a manner that accommodates the particular computing device as well as the user's typical use of the computing device. Smarter decisions can be made regarding which energy storage device to draw power from, which can allow the computing device to be run on energy storage device power for a longer duration of time and can extend the lifespan of the energy storage devices.

In the discussion that follows, a section titled "Operating Environment" is provided and describes one example environment in which one or more implementations can be employed. Following this, a section titled "Energy Storage Device Discharge Selection System Details" describes example details and procedures in accordance with one or more implementations. Last, a section titled "Example System" describes example computing systems, components, and devices that can be utilized for one or more implementations of dynamic energy storage device discharging.

Operating Environment

FIG. 1 illustrates an operating environment in accordance with one or more embodiments, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and optionally one or more applications 110 that reside on the computer-readable media and which are executable by the processing system. The processing system 104 may be configured to include multiple independent processors configured in parallel or in series and one or more multi-core processing units. A multi-core processing unit may have two or more processors ("cores") included on the same chip or integrated circuit. In one or more implementations, the processing system 104 may include multiple processing cores that provide a range of performance capabilities, processing efficiencies, and power usage characteristics.

The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a rack server or other server computer, a portable computer, a tablet or slate computer, a handheld computer such as a personal digital assistant (PDA), a cell phone, a set-top box, a wearable device (e.g., watch, band, glasses, virtual reality (VR) headsets, augmented reality (AR) headsets, etc.), a home computing device (e.g., a voice-controlled wireless speaker or other smart-home device), an enterprise commodity device (e.g., an automated teller machine (ATM)), other consumer devices (e.g., drones, smart clothing, etc.), and so forth. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. A computing device may also be configured as a wearable device 124 that is designed to be worn by, attached to, carried by, or otherwise transported by a user. Examples of wearable devices 124 depicted in FIG. 1 include glasses, headsets, a smart band or watch, and a pod device such as clip-on fitness device, media player, or tracker. Other examples of wearable devices 124 include but are not limited to badges, a key fob, an access card, and a ring, an article of clothing, a glove, or a bracelet, to name a few examples. Any of the computing devices can be implemented with various components, such as one or more processors and memory devices, as well as with any combination of differing components. One example of a computing system that can represent various systems and/or devices including the computing device 102 is shown and described below in relation to FIG. 6.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 6.

The computing device 102 also includes an energy storage device discharge selection system 126 and an energy storage device system 128 that operate as described above and below. The energy storage device discharge selection system 126 can be implemented as part of the operating system 108, can be implemented as separate from the operating system 108, or can be implemented in part by the operating system 108 and in part separate from the operating system 108. The energy storage device discharge selection system 126 can optionally be implemented as one or more discreet systems 126 working in concert. The energy storage device system 128 is configured to include multiple energy storage devices as discussed in greater detail below. The energy storage device discharge selection system 126 and energy storage device system 128 may be provided using any suitable combination of hardware, software, firmware, and/or logic devices. As illustrated, the energy storage device discharge selection system 126 and energy storage device system 128 may be configured as separate, stand-alone systems. In addition or alternatively, the energy storage device discharge selection system 126 may also be configured as a system or module that is combined with the operating system 108 or implemented via a controller or other component of the energy storage device system 128.

The energy storage device discharge selection system 126 represents functionality operable to manage energy storage devices of the energy storage device system 128, allowing selection of different energy storage devices for discharge to power the computing device 102 at different times. This may involve analyzing various criteria including static criteria for the computing device 102, dynamic system criteria for the computing device 102, and/or prediction criteria for the computing device 102. The static criteria, in contrast to the dynamic system criteria for the computing device 102, do not typically change while the computing device 102 operates. The static criteria for the computing device 102 refers to characteristics of the energy storage devices that are part of the energy storage device system 128, hardware included in and/or other physical characteristics of (such as the locations of hardware in) the computing device 102, characteristics of static software and/or firmware, static properties such as interconnect resistance or thermal zone layout (e.g., which devices are in which thermal zones) as discussed in more detail below, and so forth. The dynamic system criteria for the computing device 102 refers to characteristics of the energy storage devices that are part of the energy storage device system 128 and/or the computing device 102 that changes while the computing device 102 operates (e.g., runs the operating system 108 and one or more applications 110). The prediction criteria for the computing device 102 refers to estimated or predicted user behavior, program behavior, and/or more general usage of the computing device 102, such as removal or insertion of hot-swappable batteries that are part of the energy storage device system 128, connection of the computing device 102 to an AC power source, expected future workload and/or power usage of the computing device 102, and so forth. Connection of the computing device 102 to an AC power source refers to a connection or coupling allowing the computing device 102 to draw power from an external source to power the components of the computing device 102 and/or charge the energy storage devices. A power source can be connected to the computing device 102 via a wired connection and/or a wireless connection.

The energy storage device discharge selection system 126 can manage the energy storage devices by controlling modes of the energy storage device system 128, states of battery cells or other energy storage devices of the energy storage device system 128, availability of energy storage devices of the energy storage device system 128, and so forth. For example, the energy storage device discharge selection system 126 is operable to communicate control signals or otherwise interact with the energy storage device system 128 to direct operation of switching hardware to switch between energy storage devices to service the load in accordance with the analysis performed by the energy storage device discharge selection system 126. Details regarding these and other aspects of dynamic energy storage device discharging are discussed in the following section.

The environment 100 further depicts that the computing device 102 may be communicatively coupled via a network 130 to a service provider 132, which enables the computing device 102 to access and interact with various resources 134 made available by the service provider 132. The resources 134 can include any suitable combination of content and/or services typically made available over a network by one or more service providers. For instance, content can include various combinations of text, video, ads, audio, multi-media streams, applications, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Having described an example operating environment, consider now example details and techniques associated with one or more implementations of dynamic energy storage device discharging.

Energy Storage Device Discharge Selection System Details

To further illustrate, consider the discussion in this section of example devices, components, procedures, and implementation details that may be utilized to provide dynamic energy storage device discharging as described herein. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Device

Figure 2:
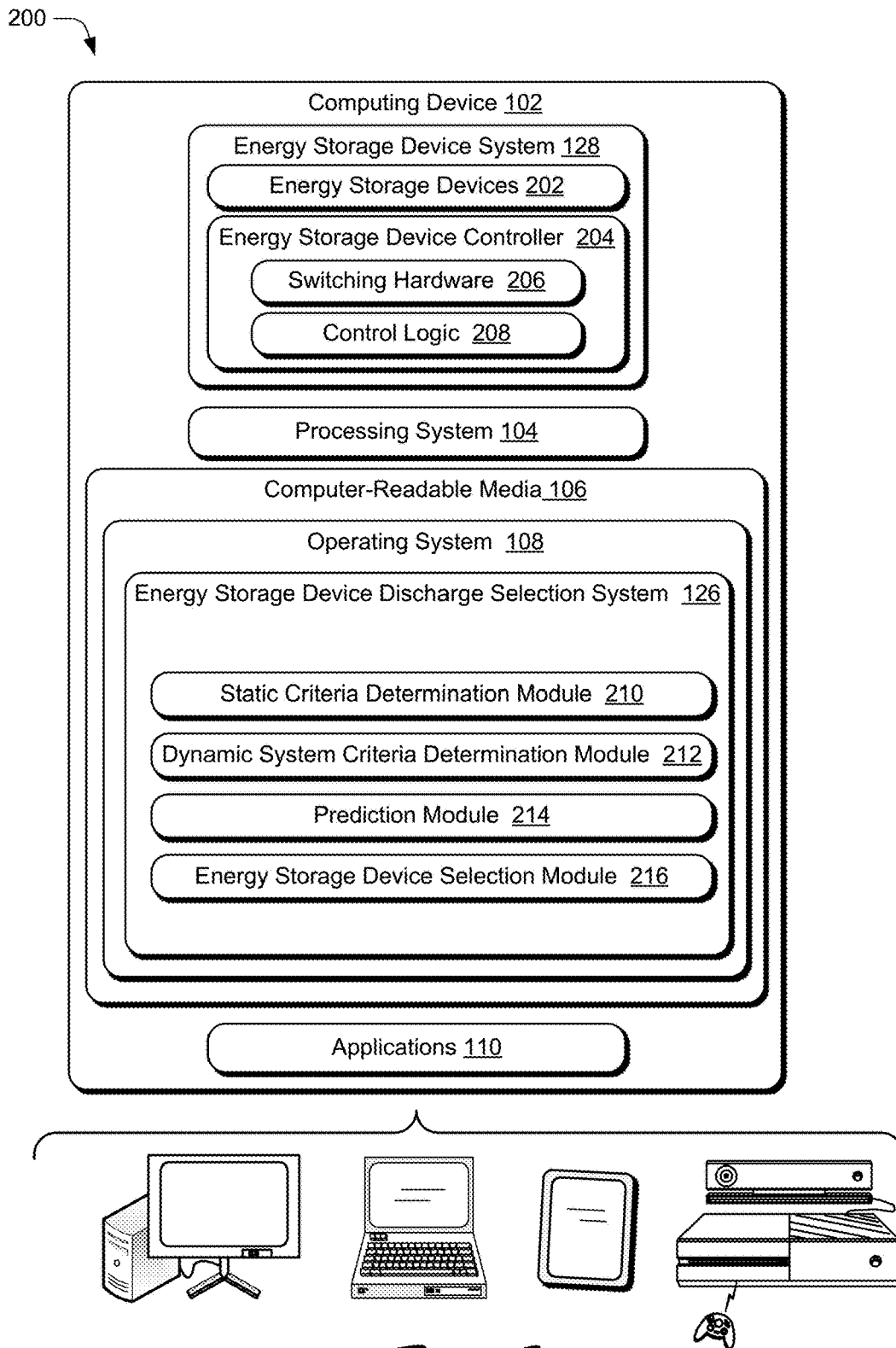
FIG. 2 depicts example details of a computing device having an energy storage device system with multiple energy storage devices in accordance with one or more implementations.

FIG. 2 depicts generally at 200 example details of a computing device 102 having an energy storage device system 128 with multiple energy storage devices in accordance with one or more implementations. Computing device 102 also includes processing system 104, computer readable media 106, operating system 108 and applications 110 as discussed in relation to FIG. 1. In the depicted example, an energy storage device discharge selection system 126 is also shown as being implemented as a component of the operating system 108. It should be noted, however, that the energy storage device discharge selection system 126 can alternatively be implemented in other manners. For example, parts of (or all of) the energy storage device discharge selection system 126 can be implemented as part of the energy storage device system 128.

By way of example and not limitation, the energy storage device system 128 is depicted as having energy storage devices 202 and an energy storage device controller 204. The energy storage devices 202 are representative of various different kinds of energy storage devices that may be included and/or compatible with the computing device 102. These energy storage devices can include, for example, individual or a collection of battery cells, supercapacitors, and so forth. Energy storage devices 202 can include energy storage devices that are designed to be included in and specifically work with the computing device 102 at the time of manufacture or distribution, and/or external energy storage devices (e.g., original equipment manufacturer (OEM) manufactured external batteries) that are added to the computing device 102 (e.g., by the user) at a later point in time. Energy storage devices 202 can include energy storage devices having different characteristics such as different sizes, capacities, chemistries, battery technologies, shapes, age, cycles, temperature, and so forth (heterogeneous energy storage devices). Accordingly, the energy storage device system 128 can include a diverse combination of multiple energy storage devices at least some of which can have different characteristics one to another. Alternatively, the energy storage devices 202 can include energy storage devices having the same characteristics. Various combinations of energy storage devices 202 may be utilized to provide a range of capacities, performance capabilities, efficiencies, power usage characteristics, and utilization of space in the device (e.g., for the purpose of balancing the weight, increasing energy storage capacity and/or energy storage characteristics), and so forth.

The energy storage device controller 204 is representative of a control system to control operation of the energy storage device system 128 and delivery of power from the energy storage devices 202 to service a system load of the computing device 102. The system load refers to the energy required by the computing device 102 at any given point in time in order to operate. The energy storage device controller 204 may be configured using various logic, hardware, circuitry, firmware, and/or software suitable to connect the energy storage devices 202 one to another, supply power to the system, switch between the energy storage devices, and so forth. By way of example and not limitation, the energy storage device controller 204 in FIG. 2 is depicted as including switching hardware 206 and control logic 208 that is operable to selectively switch between use of different designated sources of the energy storage devices 202 at different times. Control logic 208 may reflect different switching modes that switch between drawing power from different ones of the energy storage devices 202 so that power is drawn from ones of the energy storage devices 202 based on various criteria as determined by the energy storage device discharge selection system 126. Thus, rather than merely interconnecting energy storage devices in parallel or series, switching hardware 206 can be utilized to set-up a switching scheme to select different energy storage devices based on different criteria for the computing device 102.

The energy storage device discharge selection system 126 includes a static criteria determination module 210, a dynamic system criteria determination module 212, a prediction module 214, and an energy storage device selection module 216.

The static criteria determination module 210 represents functionality operable to determine values for various characteristics of the energy storage devices 202, as well as hardware components included in and/or other physical characteristics of (such as the locations of hardware included in) the computing device 102, characteristics of static software and/or firmware, static properties such as interconnect resistance or thermal zone layout (e.g., which devices are in which thermal zones) as discussed in more detail below, and so forth. These hardware components can include, for example, components of the processing system 104.

In one or more embodiments, the static criteria includes an energy storage device charge level. For many energy storage devices, the efficiency of the energy storage device degrades as the energy storage device is discharged. Thus, an energy storage device when fully charged can be more efficient at providing power than when the energy storage device has only a 25% charge. A threshold charge level is set, and whether the energy storage device has satisfied the threshold charge level (e.g., has a charge level at and/or greater than the threshold charge level) is determined. A value for the energy storage device charge level criteria is generated based on whether the energy storage device has satisfied the threshold charge level. For example, a value of 1 or True can be used to indicate that the energy storage device has satisfied the threshold charge level, and a value of 0 or False can be used to indicate that the energy storage device has not satisfied the threshold charge level.

The threshold charge level can be set in a variety of different manners, such as based on an energy storage device discharge curve. The energy storage device discharge curve is a plot of remaining charge versus time for the energy storage device as the energy storage device discharges. The discharge curve drops faster (has a more negative slope) at later times in the plot than at earlier times. That is, the discharge curve drops faster the lower the remaining charge is in the energy storage device. Different energy storage devices can have different discharge curves. The threshold charge level can be set based on the discharge curve, such as when the discharge curve starts to drop at a particular rate (e.g., starts to drop at a rate that is 10% faster than the lowest rate, has a slope of −0.2, etc.). The discharge curve can be obtained in a variety of different manners, such as from the supplier or manufacturer of the energy storage device, based on observations of discharging the energy storage device by the computing device 102 (e.g., by the operating system 108 and/or energy storage device discharge selection system 126), and so forth.

The energy storage device selection module 216 can use the threshold charge level in various different manners. In one or more embodiments, the energy storage device selection module 216 selects for a component an energy storage device to power that component that satisfies the threshold charge level for that energy storage device.

In one or more embodiments, the static criteria includes an indication of proximity of components in the computing device 102 that consume power and the energy storage device 202. The indication of proximity of components can be for all components in the computing device 102, or alternatively only select components. For example, these select components can be components that typically consume most (e.g., at least a threshold amount, such as 20%) of the power in the computing device 102, such as processing units (e.g., graphics processing unit, central processing unit), display devices, and so forth. The proximity of a component to an energy storage device refers to the electrical proximity between the components. The proximity of a component to an energy storage device can be specified using various differing values. In one or more embodiments, the proximity of a component to an energy storage device is specified by a value that represents the interconnect resistance between the component and the energy storage device. The interconnect resistance is a measure of the amount of resistance between a component and an energy storage device, and typically increases as the physical distance between the component and the energy storage device increases. Larger amounts or interconnect resistance result in larger amounts of power loss between the component and the energy storage device. Additionally or alternatively, the proximity of a component to an energy storage device is specified by a value that is the physical distance from the component to the energy storage device (e.g., as measured in centimeters or inches).

A different value representing the proximity of a component to an energy storage device is obtained for each component and energy storage device pair. The values representing the proximity of a component to an energy storage device can be obtained in a variety of different manners, such as from the supplier or manufacturer of the computing device 102, based on observations of discharging the energy storage device by the computing device 102 (e.g., by the operating system 108 and/or energy storage device discharge selection system 126), and so forth.

The energy storage device selection module 216 can use the values representing the proximity of components to energy storage devices in various different manners. In one or more embodiments, the energy storage device selection module 216 selects for a component an energy storage device to power that component that is most energy efficient for that component. For example, for a given processing unit, the energy storage device selection module 216 can select as the most efficient energy storage device for the processing unit the energy storage device having the smallest interconnect resistance to the processing unit, and/or the energy storage device having the smallest physical distance to the processing unit.

The dynamic system criteria determination module 212 represents functionality operable to determine values for various characteristics of the energy storage devices 202 and/or of the computing device 102 that changes while the computing device 102 operates (e.g., while the computing device 102 runs the operating system 108 and one or more applications 110). The criteria used by the dynamic system criteria determination module 212 are referred to as dynamic because they change over time during operation of the computing device 102. For example, the criteria used by the dynamic system criteria determination module 212 can include the temperature of a thermal zone of the computing device 102, which changes over time during operation of the computing device 102 as opposed to the proximity of a component to an energy storage device which typically does not change over time during operation of the computing device 102, the ages of the energy storage devices 202, and so forth.

In one or more embodiments, the dynamic system criteria involve different thermal zones in the computing device 102. A thermal zone refers to a group of one or more components (e.g., hardware) in the computing device 102 that are treated collectively for purposes of temperature control. Different thermal zones can have different cooling mechanisms, such as vents, fans, heat sinks, and so forth. The energy storage device discharge selection system 126 can obtain an indication of which components of the computing device 102 are in which thermal zones in various manners, such as from the supplier or manufacturer of the computing device 102. In one or more embodiments in which the computing device 102 supports the Advanced Configuration and Power Interface (ACPI) Specification, such as the Advanced Configuration and Power Interface Specification, Version 6.1 (January, 2016), the energy storage device discharge selection system 126 can obtain an indication of the thermal zones in the computing device 102, and optionally which components of the computing device 102 are in which thermal zones, by invoking methods of the ACPI.

In one or more embodiments, the dynamic system criteria includes an indication of whether each of the energy storage devices 202 is in a thermally hot (also referred to as thermally active) zone. The dynamic system criteria determination module 212 can obtain indications of temperatures of the different thermal zones in the computing device 102 in various manners, such as via the ACPI, by accessing temperature gauge components in the computing device 102, and so forth. A thermal zone is referred to as a hot zone or a thermally hot zone if the temperature of the thermal zone satisfies (e.g., is the same as, is the same as or equal to) a threshold temperature. In one or more embodiments, the threshold temperature is a value above which the designer or supplier of the computing device 102 prefers that the thermal zone not run. The threshold temperature can be, for example, a particular temperature (e.g., 85 degrees Fahrenheit), or a relative value (e.g., 80% of a maximum operating temperature of the computing device 102 as specified by the designer or supplier of the computing device 102).

The dynamic system criteria determination module 212 can also obtain an indication of which components, including which energy storage devices 202, are in which thermal zones. A value for each energy storage device can be generated based on whether the energy storage device is in a thermally hot zone. For example, a value of 1 or True can be used to indicate that the energy storage device is in a thermally hot zone, and a value of 0 or False can be used to indicate that the energy storage device is not in a thermally hot zone (which may also be referred to as a thermally stable zone).

The energy storage device selection module 216 can use the values indicating which energy storage devices are in a thermally hot zone and which energy storage devices are not in a thermally hot zone in various different manners. In one or more embodiments, the energy storage device selection module 216 selects an energy storage device that is not in a thermally hot zone to power the computing device 102. The temperature of an energy storage device typically increases as power is drawn from the energy storage device, and by selecting an energy storage device that is not in a thermally hot zone the energy storage device discharge selection system 126 facilitates managing thermal stability of the computing device 102 (e.g., keeping a thermal zone of the computing device 102 from getting too hot) when selecting which energy storage devices 202 to use to power the computing device 102.

In one or more embodiments, the dynamic system criteria includes an indication of which thermal zones the energy storage devices 202 are in. A value for each energy storage device that is the thermal zone the energy storage device 202 is in (e.g., 1, 2, 3, etc.) is determined. Alternatively, a value for each energy storage device can be generated based on, for example, how recently or some duration that the energy storage device has been used to power the computing device 102. This value can take various forms, such as a number of milliseconds, one value (e.g., 1 or True) to indicate that the energy storage device has been recently used to power the computing device 102 and another value (e.g., 0 or False) to indicate that the energy storage device has not been recently used to power the computing device 102, and so forth.

The energy storage device selection module 216 can use the values indicating which thermal zones the energy storage devices are in in various different manners. In one or more embodiments, the energy storage device selection module 216 selects an energy storage device to duty cycle power from the energy storage devices in different thermal zones. The temperature of an energy storage device typically increases as power is drawn from the energy storage device, so by duty cycling the energy storage devices in different thermal zones the increase in heat as a result of drawing power from the energy storage devices is effectively reduced.

In one or more embodiments, the dynamic system criteria includes an indication of whether the energy delivery path from each of the energy storage devices 202 passes through a thermally hot (also referred to as thermally active) zone. The energy delivery path refers to the various components that energy passes through when being provided by particular energy storage device to power a particular component. The dynamic system criteria determination module 212 can obtain indications of temperatures of the different thermal zones in the computing device 102 in various manners, as discussed above. The dynamic system criteria determination module 212 can also obtain an indication of which components, including the various components included in the various energy delivery paths, are in which thermal zones. A value for each energy storage device can be generated based on whether the energy delivery path passes through a thermally hot zone. For example, a value of 1 or True can be used to indicate that the energy delivery path passes through a thermally hot zone, and a value of 0 or False can be used to indicate that the energy delivery path does not pass through a thermally hot zone (which may also be referred to as a thermally stable zone).

The energy storage device selection module 216 can use the values indicating which energy delivery paths pass through a thermally hot zone and which energy delivery paths do not pass through a thermally hot zone in various different manners. In one or more embodiments, the energy storage device selection module 216 selects an energy storage device that provides power via an energy delivery path that does not pass through a thermally hot zone to power the computing device 102. By selecting an energy storage device that provides power via an energy delivery path that does not pass through a thermally hot zone, the energy storage device discharge selection system 126 facilitates managing thermal stability of the computing device 102 (e.g., keeping a thermal zone of the computing device 102 from getting too hot) when selecting which energy storage devices 202 to use to power the computing device 102.

In one or more embodiments, the dynamic system criteria includes an indication of which thermal zones the energy delivery paths from each of the energy storage devices 202 pass through. A value for each energy storage device that is the thermal zone(s) the energy delivery path from the energy storage device 202 passes through (e.g., 1, 2, 3, etc.) is determined. Alternatively, a value for each energy storage device can be generated based on, for example, how recently or some duration that the energy storage device has been used to power the computing device 102. This value can take various forms, such as a number of milliseconds, one value (e.g., 1 or True) to indicate that the energy storage device has been recently used to power the computing device 102 and another value (e.g., 0 or False) to indicate that the energy storage device has not been recently used to power the computing device 102, and so forth.

The energy storage device selection module 216 can use the values indicating which thermal zones the energy delivery paths pass through in various different manners. In one or more embodiments, the energy storage device selection module 216 selects an energy storage device to duty cycle power through different energy delivery paths that pass through different thermal zones. By duty cycling the energy delivery paths, the energy storage device discharge selection system 126 facilitates managing thermal stability of the computing device 102 (e.g., keeping a thermal zone of the computing device 102 from getting too hot) when selecting which energy storage devices 202 to use to power the computing device 102.

In one or more embodiments, the dynamic system criteria includes an indication of whether the computing device 102 is under a high power load. The computing device 102 is referred to as being under a high power load if the power drawn from the energy storage devices 202 satisfies (e.g., is the same as, is the same as or equal to) a threshold amount of power. The threshold amount of power can be, for example, a fixed amount of power (e.g., 50 watts), or a relative value (e.g., 80% of a maximum amount of power that the energy storage devices 202 can provide to the computing device 102 as specified by the designer or supplier of the energy storage devices 202 or the computing device 102).

A single value can be generated for the computing device 102 and/or individual values can be generated for the individual energy storage devices. An individual energy storage device can be referred to as being under a high power load if the power drawn from the energy storage device satisfies (e.g., is the same as, is the same as or equal to) a threshold amount of power. The threshold amount of power can be, for example, a fixed amount of power (e.g., 50 watts), or a relative value (e.g., 80% of a maximum amount of power that the energy storage device can provide to the computing device 102 as specified by the designer or supplier of the energy storage device).

A value for the computing device 102 can be generated based on whether the computing device 102 is under a high power load. For example, a value of 1 or True can be used to indicate that the computing device 102 is under a high power load, and a value of 0 or False can be used to indicate that the computing device 102 is not under a high power load (which may also be referred to as a low power load). A value for each individual energy storage device 202 can also be generated based on whether the computing device 102 is under a high power load. The value be a binary value, such as a value of 1 or True to indicate that the energy storage device is under a high power load, and a value of 0 or False to indicate that the energy storage device is not under a high power load. The value can also be a non-binary value, such as a value indicating the current load of the energy storage device relative to the maximum amount of power that the energy storage device can provide (e.g., a percentage of the maximum amount of power that the energy storage device is capable of providing), a value indicating the current load of the energy storage device relative to the load of another energy storage device (e.g., a value indicating the energy storage device is providing the same amount of power, more power, or less power than another energy storage device(s)), and so forth.

The energy storage device selection module 216 can use the value indicating whether the computing device 102 is under a high power load in various different manners. In one or more embodiments, the energy storage device selection module 216 selects two or more energy storage devices in situations in which the computing device 102 is under a high power load. Drawing power from multiple energy storage devices in situation in which the computing device 102 is under a high power load helps counteract Peukert's law. Peukert's law indicates that as the amount of current drawn from an energy storage device increases, the available energy that the energy storage device can provide reduces. By drawing power from multiple energy storage devices, the amount of current drawn from each energy storage device is less than if all the power were drawn from a single energy storage device, resulting in less reduction of available energy from the energy storage devices.

The prediction module 214 represents functionality operable to determine values for various characteristics of estimated or predicted user behavior (e.g., predicting the intent of the user), program behavior (e.g., predicting how the software installed is using/causing usage of the system, such as an antivirus service), and/or more general usage of the computing device 102. This predicted behavior or usage can include, for example, removal or insertion of hot-swappable batteries that are part of the energy storage device system 128, connection of the computing device 102 to an AC power source, expected future workload and/or power usage of the computing device 102, and so forth.

In one or more embodiments, the predicted behavior or usage includes energy storage device presence predictions. An energy storage device can optionally be an energy storage device that can be removed from (and optionally is external to) the housing that includes other components of the computing device 102 (such as the processing system 104). The energy storage device can be implemented in various manners, such as a removable energy storage device (e.g., a hot-swappable battery that can be inserted into and withdrawn from the housing during operation of the computing device 102 while the computing device 102 is not powered off, or a cold-swappable battery that may be removed only when the computing device is not functional (e.g., is powered off)), an energy storage device in a removable peripheral device (e.g., an energy storage device in a keyboard coupled to the housing), an energy storage device in a case or protective cover of the computing device 102, and so forth.

A value is obtained for each energy storage device indicating whether the energy storage device is predicted to be no longer present (e.g., removed) in the near future and whether other energy storage devices in the computing device 102 are predicted to be able to provide the power to the computing device 102 for the duration that the energy storage device is not present. For example, a value of 1 or True can be used to indicate that the energy storage device is predicted to be removed in the near future and the other energy storage devices in the computing device 102 are not predicted to be able to provide power to the computing device 102 for the duration that the energy storage device is not present, and a value of 0 or False can be used to indicate that the energy storage device is not predicted to be removed in the near future and/or the other energy storage devices in the computing device 102 are able to provide power to the computing device 102 for the duration that the energy storage device is not present. By way of another example, a non-binary value may be used to indicate whether the energy storage device is predicted to be no longer present (e.g., removed) in the near future and whether other energy storage devices in the computing device 102 are predicted to be able to provide the power to the computing device 102 for the duration that the energy storage device is not present, such as a probability value (e.g., a percentage ranging from 0% to 100%) of how likely it is that the energy storage device will be removed in the near future and the other energy storage devices in the computing device 102 not be able to provide power to the computing device 102 for the duration that the energy storage device is not present.

The energy storage device selection module 216 can use the values representing whether the energy storage devices are predicted to be no longer present (e.g., removed) in the near future and whether other energy storage devices in the computing device 102 are able to provide the power to the computing device 102 for the duration that the energy storage device is not present in various different manners. In one or more embodiments, if an energy storage device is predicted to be removed in the near future and the other energy storage devices in the computing device 102 are not predicted to be able to provide power to the computing device 102 for the duration that the energy storage device is not present, then the energy storage device selection module 216 selects to draw power from an the energy storage device that is predicted to be removed in the near future. By drawing power from the energy storage device that is predicted to be removed in the near future, power in the remaining energy storage devices that are not predicted to be ejected or removed can be conserved.

In one or more embodiments, an energy storage device predicted to be removed in the near future refers to an energy storage device that is predicted to be removed within some threshold value. This threshold value can be, for example, a threshold amount of time of the current time (such as on the order of minutes or hours, such as 10 minutes or 2 hours). This threshold value can also be a threshold amount of energy, such as an absolute energy value or a percent value.

The prediction module 214 can estimate or predict that an energy storage device is to be removed in the near future in a variety of different manners. In one or more embodiments, the prediction module 214 maintains a record (e.g., over a matter of weeks or months) indicating times of the day and/or days of the week that the energy storage device is present and times of the day and/or days of the week that the energy storage device is not present. From this record, the prediction module 214 can identify usage patterns that indicate when the energy storage device is not present at the computing device 102 and the durations when the energy storage device is not present at the computing device 102. Any of a variety of public and/or proprietary techniques can be used to analyze the record to identify usage patterns.

For example, if every Monday (or at least a threshold number of Mondays, such as 80%) from 3:00 pm-5:00 pm the energy storage device is not present at the computing device 102, then the prediction module 214 can predict that on the following Monday from 3:00 pm-5:00 pm the energy storage device will not be present at the computing device 102. By way of another example, if every day of the week (or at least a threshold number of days, such as 75%) from noon-1:00 pm the energy storage device is not present at the computing device 102, then the prediction module 214 can predict that, if it is currently 11:00 am, the energy storage device will not be present at the computing device 102 from noon-1:00 pm on the current day.

Additionally or alternatively, the prediction module 214 can estimate or predict that an energy storage device is to be removed in the near future based on any of a variety of other data. The prediction module 214 can obtain data from various different sources and analyze the data using any of a variety of public and/or proprietary techniques to identify expected future usage patterns.

By way of example, the prediction module 214 can obtain data from a calendar of the user of the computing device 102. The calendar can include appointments or meetings with locations away from the user's office or home, and the prediction module 214 can predict, for example, that an energy storage device will not be present at the computing device 102 during those appointments or meetings.

By way of example, the prediction module 214 can obtain data from a cloud service that collects usage data for computing devices. The cloud service can provide an indication of times of the day and/or days of the week when users of computing devices of the same type as computing device 102 have an energy storage device not present. The prediction module 214 can predict, for example, that an energy storage device will not be present at the computing device 102 during those times of the day and/or days of the week indicated by the cloud service.

The prediction module 214 can estimate or predict various timing information regarding when the computing device is to be connected to an AC power source, such as how soon the computing device will be connected to an AC power source and/or for how long (a duration that) the computing device will be connected to the AC power source. In one or more embodiments, the predicted behavior or usage includes predicted connection of the computing device 102 to an AC power source in the near future and/or a duration of the connection to the AC power source. A value is determined indicating whether the computing device 102 is predicted to be connected to an AC power source (and thus allow charging of the energy storage devices and/or powering of the computing device 102 on AC power rather than power drawn from the energy storage devices) in the near future. For example, a value of 1 or True can be used to indicate that the computing device is predicted to be connected to an AC power source in the near future, and a value of 0 or False can be used to indicate that the computing device is not predicted to be connected to an AC power source in the near future. By way of another example, various non-binary values can be used. For example, values indicating how much power can be delivered by the AC power source that the computing device is predicted to be connected to can be generated, values indicating how long the computing device is expected to be connected to the AC power source can be generated, values indicating how much energy is expected to be drawn from the AC power source for the duration that the computing device is connected to the AC power source can be generated, and so forth.

The energy storage device selection module 216 can use these values in various different manners. For example, if the computing device is predicted to be connected to an AC power source in the near future, then the energy storage device selection module 216 selects to draw power from energy storage devices in a balanced manner. This balanced manner can include, for example, duty cycling power from the energy storage devices in order to balance battery wear.

By way of another example, the energy storage device selection module 216 can determine to draw power from the energy storage devices in a balanced manner in response to the computing device being predicted to be connected to an AC power source in the near future and each of the energy storage devices having sufficient charge to power the computing device 102 until the computing device 102 is attached to an AC power source. This allows the energy storage device selection module 216 to pro-actively manage aging of the energy storage device. If one or more of the energy storage devices do not have sufficient charge to power the computing device 102 until the computing device 102 is attached to an AC power source then various other actions can be taken, such as drawing more power from the energy storage device having a higher charge than the other energy storage device.

By way of yet another example, the energy storage device selection module 216 can determine to save the energy in the internal energy storage device if the computing device is not predicted to be connected to an external power source such as an AC power source, a wireless power source, or an external energy storage device, long enough to deliver a particular amount of energy to charge the energy storage devices.

In one or more embodiments, the computing device can use the predicted timing information for when the computing device is to be connected to an AC power source in various manners, such as comparing the values to various different threshold values. This threshold value can be, for example, a threshold amount of time (such as on the order of minutes or hours, such as 15 minutes or 3 hours) regarding how soon in the future from the current time the computing device is predicted to be connected to an AC power source, a threshold amount of time (such as on the order of minutes or hours, such as 5 minutes or 2 hours) regarding how long the computing device is predicted to be connected to an AC power source, and so forth. This threshold value can also be a threshold amount of energy, such as an absolute energy value or a percent value. This threshold amount of energy can be, for example, an amount of energy that the AC power source the computing device is predicted to be connected to is able to deliver for the expected duration that the computing device is connected to the AC power source.

The prediction module 214 can estimate or predict timing information for when the computing device is to be connected to an external power source in a variety of different manners. In one or more embodiments, the prediction module 214 maintains a record (e.g., over a matter of weeks or months) indicating times of the day and/or days of the week that the computing device connected to an AC power source. From this record, the prediction module 214 can identify usage patterns that indicate when the computing device is connected to an AC power source and the durations when the computing device is connected to an AC power source. Any of a variety of public and/or proprietary techniques can be used to analyze the record to identify usage patterns.

For example, if every Sunday (or at least a threshold number of Sundays, such as 80%) from noon to midnight the computing device is connected to an AC power source, then the prediction module 214 can predict that on the following Sunday from noon to midnight the computing device will be connected to an AC power source. By way of another example, if every day of the week (or at least a threshold number of days, such as 75%) from midnight to 6:00 am the computing device is connected to an AC power source, then the prediction module 214 can predict that, if it is currently 11:00 pm, the computing device will be connected to an AC power source the following day from noon to 6:00 am.

Additionally or alternatively, the prediction module 214 can estimate or predict timing information for when the computing device will be connected to an AC power source based on any of a variety of other data. The prediction module 214 can obtain data from various different sources and analyze the data using any of a variety of public and/or proprietary techniques to identify expected future usage patterns.

By way of example, the prediction module 214 can obtain data from a calendar of the user of the computing device 102. The past usage data (the record indicating times of the day and/or days of the week that the computing device connected to an AC power source) can be compared to the user's calendar and a determination made that during meetings (or meetings at particular locations) the computing device is connected to an AC power source. The prediction module 214 can predict, for example, that the computing device will be connected to an AC power source during upcoming meetings (or meetings at particular locations) identified in the user's calendar.

By way of example, the prediction module 214 can obtain location data for the computing device 102, such as from a location awareness module of the computing device 102 (e.g., using a global positioning system (GPS), Bluetooth, Wi-Fi, triangulation, etc.). The past usage data (the record indicating times of the day and/or days of the week that the computing device connected to an AC power source) can be compared to the user's locations and a determination made that at certain locations (e.g., home) the computing device is connected to an AC power source. The prediction module 214 can predict, for example, that the computing device will be connected to an AC power source if the user is currently within a threshold distance (e.g., one mile) of home, but not connected to an AC power source if the user is currently within a threshold distance (e.g., one mile) of work and heading towards work (based on calendar entries, meeting appointments, heading on map/navigation application, etc.).

By way of example, the prediction module 214 can obtain data from a cloud service that collects usage data for computing devices. The cloud service can provide an indication of times of the day and/or days of the week when users of computing devices of the same type as computing device 102 have their computing devices connected to an AC power source. The prediction module 214 can predict, for example, that the computing device will be connected to an AC power source during those times of the day and/or days of the week indicated by the cloud service.

In one or more embodiments, the predicted behavior or usage includes expected future workload and/or power usage of the computing device 102. The expected future workload and/or power usage of the computing device 102 is determined, and a determination is made as to whether there is sufficient charge in the energy storage devices to perform the expected future workload and/or power usage of the computing device 102. A value is determined indicating whether there is sufficient charge in the energy storage devices to perform the expected future workload and/or power usage of the computing device 102. The expected future workload and/or power usage of the computing device 102 can be used, for example. as a factor in determining whether the charge in the energy storage devices is sufficient for some amount of time.

The energy storage device selection module 216 can use the values representing whether there is sufficient charge in the energy storage devices to perform the expected future workload and/or power usage of the computing device 102 in various different manners. In one or more embodiments, if there is sufficient charge in the energy storage devices to perform the expected future workload and/or power usage of the computing device 102, then the energy storage device selection module 216 selects to draw power from energy storage devices in a balanced manner. This balanced manner can include, for example, duty cycling power from the energy storage devices.

The energy storage device selection module 216 optionally determines to draw power from the energy storage devices in a balanced manner in response to there being sufficient charge in the energy storage devices to perform the expected future workload and/or power usage of the computing device 102. If one or more of the energy storage devices do not have sufficient charge to perform the expected future workload and/or power usage of the computing device 102 then various other actions can be taken, such as drawing more power from the energy storage device having a higher charge than the other energy storage device, drawing power from the energy storage devices based on the predicted availability of the energy storage devices, and so forth.

The prediction module 214 can estimate or predict the expected future workload and/or power usage of the computing device 102 in a variety of different manners. The prediction module 214 estimates or predicts the expected future workload and/or power usage of the computing device 102 as an aggregate function of location, user activity, and derived intent. In one or more embodiments, the prediction module 214 maintains a record (e.g., over a matter of weeks or months) indicating times of the day and/or days of the week and the power usage during those times and/or days. From this record, the prediction module 214 can identify usage patterns that indicate power usage of the computing device 102. Any of a variety of public and/or proprietary techniques can be used to analyze the record to identify usage patterns based on time and/or day. Additionally or alternatively, the prediction module 214 maintains a record of applications run on the computing device 102 and the power usage while those applications are run. From this record, the prediction module 214 can identify usage patterns that indicate power usage of the computing device 102 based on application(s) running. Any of a variety of public and/or proprietary techniques can be used to analyze the record to identify usage patterns.

For example, if every Monday (or at least a threshold number of Mondays, such as 80%) from 7:00 am to 10:00 am a particular amount of power (e.g., 1500 milliwatt hours (mWh)) is used, then the prediction module 214 can predict that on the following Monday from 7:00 am to 10:00 am the computing device will use that same particular amount of power (e.g., 1500 mWh). By way of another example, if every day of the week (or at least a threshold number of days, such as 75%) from noon to 1:00pm the computing device uses a particular amount of power (e.g., 30 mWh), then the prediction module 214 can predict that, if it is currently 11:00 am, the computing device will use 30 mWh from noon to 1:00 pm today. By way of yet another example, if every time (or at least a threshold number of times, such as 70%) an image processing application is run on the computing device the computing device uses 1000 milliwatts per hour (mW/h), then the prediction module 214 can predict that, if that image processing is currently running on the computing device then the computing device will currently use 1000 mW/h.

Additionally or alternatively, the prediction module 214 can estimate or predict the expected future workload and/or power usage of the computing device 102 based on any of a variety of other data. The prediction module 214 can obtain data from various different sources and analyze the data using any of a variety of public and/or proprietary techniques to identify expected future usage patterns.

By way of example, the prediction module 214 can obtain data from a calendar of the user of the computing device 102. The past usage data (the record indicating times of the day and/or days of the week and the power usage during those times and/or days) can be compared to the user's calendar and a determination made that during meetings (or meetings at particular locations) the computing device uses a particular amount of power (e.g., 50 mW/h). The prediction module 214 can predict, for example, that the computing device will also use 50 mW/h during upcoming meetings (or meetings at particular locations) identified in the user's calendar, or more than 50 mW/h (e.g., 70 mW/h) if the user is marked as meeting presenter.

By way of example, the prediction module 214 can obtain data from a calendar and/or digital personal assistant (e.g., the Cortana® personal assistant) of the user of the computing device 102. The prediction module 214 can predict, given this obtained data, when the user will be away from the computing device 102 (e.g., for a meeting, for coffee, etc.). The prediction module 214 can further predict, for example, that the computing device will use a small amount of power (e.g., 5 mW/h) while the user is away from the computing device 102.

By way of example, the prediction module 214 can obtain location data for the computing device 102, such as from a location awareness module of the computing device 102. The past usage data (the record indicating times of the day and/or days of the week and the power usage during those times and/or days) can be compared to the user's locations and a determination made that at certain locations (e.g., home) the computing device uses a particular amount of power (e.g., 100 mW/h). The prediction module 214 can predict, for example, that the computing device will also use 100 mW/h when the user is next at home.

By way of example, the prediction module 214 can obtain data from a cloud service that collects usage data for computing devices. The cloud service can provide an indication of times of the day and/or days of the week and the power usage during those times and/or days for other computing devices of the same type as computing device 102. The prediction module 214 can predict, for example, that the computing device will use similar or the same amount of power during those times of the day and/or days of the week indicated by the cloud service.

Given the information from the static criteria determination module 210, the dynamic system criteria determination module 212, and/or the prediction module 214, the energy storage device selection module 216 can readily select which energy storage devices 202 power is to be drawn from at any particular time. The determination of which energy storage device(s) 202 to draw power from can be made at various times, such as at regular or irregular intervals (e.g., some time duration), in response to certain events (e.g., a temperature in thermal zone satisfying a threshold value, such as 80% of a maximum temperature desired by a designer or supplier of the computing device 102), and so forth.

In one or more embodiments, the energy storage device selection module 216 uses the individual criteria as discussed above. The energy storage device selection module 216 can use individual criteria or alternatively any combination of criteria. For example, if an energy storage device is predicted to be removed in the near future and there is not sufficient power to power the computing device 102 for the duration that the energy storage device is not present (e.g., due to other energy storage devices in the computing device 102 being unable to provide the power, the computing device not being predicted to be connected to an AC power source in the near future, and so forth), then the energy storage device selection module 216 selects to draw power from an the energy storage device that is predicted to be removed in the near future. This conserves charge in the other energy storage devices in the computing device 102 when they are not predicted to have sufficient power for all desired future use and/or power cannot be replenished to those other energy storage devices.

Additionally or alternatively, the energy storage device selection module 216 can apply various different rules or algorithms to determine which energy storage device(s) 202 to draw power from at any given time. In one or more embodiments, the energy storage device selection module 216 attempts to satisfy all the criteria used by the energy storage device discharge selection system 126. Although various criteria are discussed herein, it should be noted that not all of the criteria discussed herein need by used by the energy storage device discharge selection system 126. Additionally or alternatively, additional criteria can also be used by the energy storage device discharge selection system 126.

If all of the criteria used by the energy storage device discharge selection system 126 can be satisfied, then the energy storage device selection module 216 selects which energy storage device(s) to draw power from at any given time so that all the criteria used by the energy storage device discharge selection system 126 are satisfied. However, situations can arise where all of the criteria cannot be satisfied. For example, the closest energy storage device 202 to a particular component may be in a thermally hot zone, so one criteria may indicate to use that energy storage device but another criteria indicates not to use that energy storage device.

In one or more embodiments, each criteria is assigned a different classification. Various different classification levels with various different labels can be used, and these classification levels can be assigned statically and/or dynamically. Any of a variety of different classification names or labels can be used. One example of classification levels is (in order of priority or importance) critical, important, and informational. Other classification levels or labels can alternatively be used, such as a number or an "importance" value (e.g., 0 through 100). Higher classification levels are given priority over lower classification levels. For example, assume that proximity of components to the energy storage devices powering the components is given a classification level of important, and the energy storage device being in a thermally stable zone is given a classification level of critical (which is higher than important). If the most energy efficient energy storage device 202 for a particular component is in a thermally hot zone, then the energy storage device selection module 216 selects an energy storage device 202 to power the component other than the most energy efficient energy storage device 202 because selecting an energy storage device in a thermally stable zone is given priority over selecting the energy storage device that is most energy efficient. The other energy storage device 202 that is selected by the energy storage device selection module 216 can be, for example, the most energy efficient energy storage device 202 for the component that is in a thermally stable zone.

In one or more embodiments, situations can also arise in which criteria at the same classification level conflict with one another. Such situations can be resolved in various manners, such as by using priority levels assigned to the different criteria. These priority levels can be assigned statically and/or dynamically. Any of a variety of different priority names or labels can be used. One example of labels is (in order of priority or importance) high, medium, and low. If two different criteria having the same classification level conflict (e.g., one criteria indicates that a particular energy storage device should be used and another indicates that particular energy storage device should not be used), then the energy storage device selection module 216 applies the criteria having the higher priority. However, if two different criteria having the same priority level but different classification levels conflict, then the energy storage device selection module 216 applies the criteria having the higher classification level.

The evaluation of classifications levels and priority levels can alternatively be performed in the reverse order. For example, if two different criteria conflict (e.g., one criteria indicates that a particular energy storage device should be used and another indicates that particular energy storage device should not be used), then the energy storage device selection module 216 applies the criteria having the higher priority. Situations can arise in which criteria at the same priority level conflict with one another. Such situations can be resolved in various manners, such as by using classification levels assigned to the different criteria. E.g., if two different criteria having the same priority level conflict (e.g., one criteria indicates that a particular energy storage device should be used and another indicates that particular energy storage device should not be used), then the energy storage device selection module 216 applies the criteria having the higher classification level.

In one or more embodiments, the energy storage device selection module 216 applies battery age balancing in selecting energy storage devices. The battery age balancing can be considered an additional criteria. Battery age balancing refers to the act of using two or more energy storage devices such that they are used proportionally according to their size, chemistry, and designed cycle count. In other words, the act of age balancing intends to use the least degraded batteries as much as possible. Many energy storage devices degrade (e.g., lose capacity) as the number of charge/discharge cycles they've undergone increases. By performing battery age balancing, energy storage device degradation is reduced in the computing device 102 (e.g., the energy storage devices degrade at approximately the same rate).

In one or more embodiments, the energy storage device selection module 206 can also reduce the performance of hardware components. Reducing the performance of a hardware component refers to reducing the amount of heat generated by the component, typically by running the hardware component at a slower frequency or rate. For example, the performance of a processing unit can be reduced by slowing the frequency at which the processing unit runs (e.g., from 1.2 gigahertz (GHz) to 800 megahertz (MHz)).

In one or more embodiments, the energy storage device selection module 206 can also influence operation of software components. This can be done in various manners, such as by limiting performance, by putting resource constraints and/or budget on the software (currently in operation or due to run in the future), by means of suspending operation (by means of postponing running of software or cancelling it all together), combinations thereof, and so forth.

The energy storage device selection module 206 can determine to reduce the performance of a hardware component in various different manners. In one or more embodiments, the energy storage device selection module 206 determines to reduce the performance of a hardware component in order to satisfy one or more of the criteria discussed above. For example, if an energy storage device is predicted to be removed in the near future and the other energy storage devices in the computing device 102 are not predicted to be able to provide power to the computing device 102 for the duration that the energy storage device is not present, and if the energy storage device is located in a thermally hot zone, the energy storage device selection module 216 can determine to continue to draw power from that energy storage device (because it is expected to be removed in the near future), and furthermore determine to reduce the performance of a graphics processing unit in that same thermally hot zone to reduce the temperature in that thermal zone (or at least to counteract the increase in temperature in the thermal zone as a result of drawing power from the energy storage device).

It should also be noted that although discussions are made herein to selecting which energy storage device to draw power from, the selection can additionally or alternatively be a selection of what ratio to draw power from multiple different energy storage devices. For example, using the criteria discussed herein the energy storage device selection module 216 can select two energy storage devices (e.g., two energy storage devices in the same thermal zone) and draw power from both (e.g., 50% power from both, more power (e.g., 75% of the desired power) from the energy storage device that is most efficient for the component and the remaining power (e.g., 25% of the desired power) from the other energy storage device in the thermal zone), and so forth.

The techniques discussed herein provide a dynamic approach to selecting which of multiple energy storage devices to draw power from. This dynamic approach various based on multiple different criteria, and can factor in the way in which a user uses his or her computing device. Thus, rather than having a one-size-fits-all approach to selecting an energy storage device to draw power from, the dynamic approach discussed herein is customized or tailored to the individual user. This results in reducing the energy loss in energy storage devices during operation of the computing device, approximately uniform aging of energy storage devices, improved thermal stability of the computing device, and extended usability of the computing device.

Example Discharging Architecture

Generally speaking, an energy storage device system 128 having multiple energy storage devices may be configured in various ways and employ a variety of different types of energy storage devices. The references to an energy storage device herein can refer to an individual battery cell, a collection of battery cells, a collection of battery cells managed by a smart battery controller, combinations thereof, and so forth. In one or more implementations, different energy storage devices 202 included with a system have different characteristics, such as differences in one or more of battery chemistry, capacity, voltage, size, and/or shapes, to name a few examples. Using different types of energy storage devices provides flexibility for design of the energy storage device system and circuit boards, and consequently enables device developers to make better utilization of internal space to provide devices having increased battery life and efficiency. The different energy storage devices are arranged in a circuit that enables selective switching among the energy storage devices.

Figure 3:
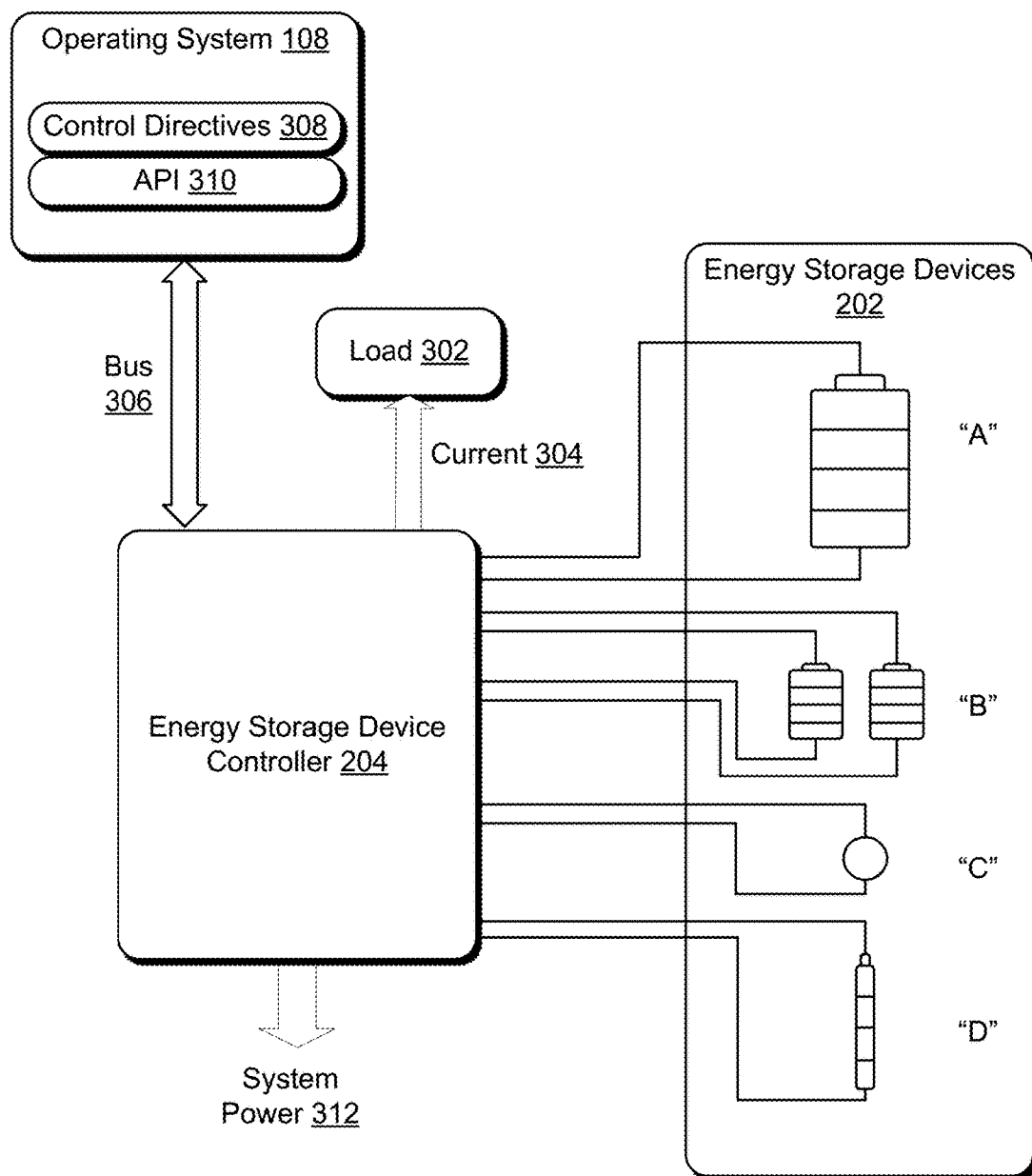
FIG. 3 depicts one illustrative example discharging architecture for an energy storage device system having multiple energy storage devices.

In particular, FIG. 3 depicts generally at 300 an illustrative example discharging architecture for an energy storage device system having multiple energy storage devices 202. The energy storage devices 202 may be connected in a circuit that includes an energy storage device controller 204 as described in relation to the example of FIG. 2. In the depicted example, energy storage devices 202 include different representative energy storage devices labeled "A", "B", "C", and "D". Each of the energy storage devices is connected directly to the charge energy storage device 204 in a manner that provides individual current paths to and from each of the energy storage devices for charging and/or discharging. The depicted energy storage devices 202 are also represented as a collection of heterogeneous energy storage devices, although the energy storage devices 202 can alternatively be the same types of energy storage devices.

The energy storage device controller 204 is depicted as being connected to a load 302 to which current 304 drawn from the energy storage devices 202 can be provided. To draw current from the energy storage devices 202 and perform the discharging, the energy storage device controller 204 may implement a discharging strategy that selects different energy storage devices for discharging at different times as determined by the energy storage device selection module 216 as previously discussed. When power is drawn from the energy storage devices, switching hardware 206 of the energy storage device controller 204 can direct the current be drawn from the energy storage devices using the individual current paths (e.g., on a per-energy storage device basis).

As further represented in FIG. 3, the energy storage device controller 204 may be configured to coordinate discharging activity with an operating system 108 via communications exchanged via a bus 306 (e.g., an FC bus or other suitable communication bus) or other suitable communication channel. In particular, the operating system 108 may include an energy storage device selection module 216 or comparable functionally that is operable to direct operation of the energy storage device controller 204 as discussed herein. In order to do so, the operating system 108 may communicate control directives 308 to the energy storage device controller 204 that provides indications regarding which energy storage devices 202 to discharge at which times. The control directives 308 are configured to dynamically program the energy storage device controller 204 to discharge (draw current from) the desired energy storage devices 202 at the desired times as indicated by the energy storage device selection module 216.

Control directives 308 may be configured as any suitable messages, signals, or communications that are effective to convey information regarding policy decisions and selected strategies to set-up the energy storage device controller 204 accordingly. By way of an example and not limitation, the operating system may expose an application programming interface (API) 310 that may be used by the energy storage device selection module 216 and/or other applications to interact with and configure the energy storage device controller 204. In one approach, the API 310 may be invoked to communicate control directives 308 that are configured to set registers of the energy storage device controller 204. In any event, the control directives 308 provide a mechanism to access and manipulate discharging functionality provided via the energy storage device controller 204 to implement different strategies and tailor charging to different scenarios.

Figure 4:
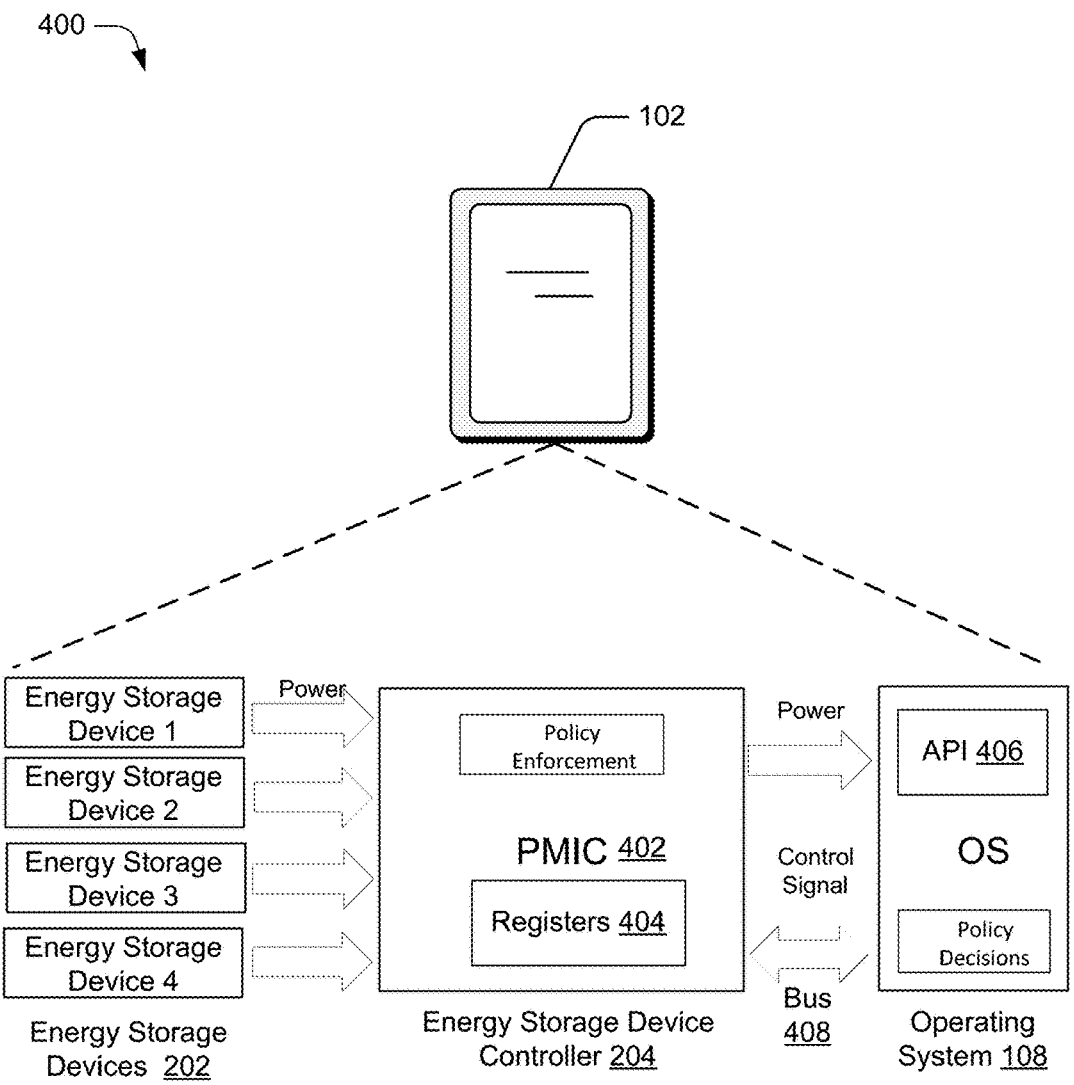
FIG. 4 depicts example details of a system having multiple energy storage devices in accordance with one or more implementations.

FIG. 4 depicts generally at 400 example details of a system having multiple energy storage devices in accordance with one or more implementations. In particular, the example of FIG. 4 depicts a system having energy storage devices 202 that may be integrated with a computing device 102. Power is supplied via the energy storage devices using the techniques discussed herein, such as via an energy storage device controller 204, which includes switching hardware 206 and control logic 208. In the depicted example, the energy storage device controller 204 is implemented via a power management integrated circuit (PMIC) 402 that is adapted to support energy storage device switching. For instance, in one or more implementations, the PMIC or other energy storage device controller is adapted to include registers 404 to facilitate policy enforcement of a switching policy. The registers 404 may be configured to hold various parameters that the control logic 208 makes use of to control operation of switching hardware 206 and supply power from the energy storage devices accordingly. For example, registers 404 may include registers indicative of the determined power ratio, the switching policy, a selected switching mode, a timing register, and battery cell specific registers indicative of battery states, characteristics, and designated current switching constraints (amounts, weights, percentages, thresholds, etc.). Registers may be assigned default values selected for general usage in typical scenarios. Registers may then be selectively adapted under the influence of the operating system and/or user input to implement policy settings for different use cases.

The registers 404 implemented by the energy storage device controller 204 are exposed to enable operating system 108 control over switching. In other words, the registers 404 provide user accessible control over energy storage device switching. By way of example and not limitation parameter values for the registers 404 may be set and updated dynamically via an application programming interface (API) 406 that is exposed via the operating system 108 as represented in FIG. 4. Rather than API calls, parameter values for the registers 404 may be provided as data structures exchanged to express policy and control asserted from the energy storage device discharge selection system 126 (e.g., manifested in the operating system 108) to the energy storage device controller 204. API messages, data structures, and/or other control signals may be exchanged between the energy storage device controller 204 and the operating system 108 over a suitable communication bus 408, one example of which is an FC bus. Information regarding energy storage device states, workload, and characteristics of energy storage devices 202 may also be communicated to the operating system 108 and/or energy storage device discharge selection system 126 via the control signals and/or API to facilitate assessments of the operational context and policy decisions based on the operational context.

It should be noted that, in one or more embodiments, the PMIC 402 hosts logic for the energy storage device discharge selection system 126 and/or the energy storage device controller 204. This aids efficiency and speed of decision making. In situations in which the PMIC 402 hosts the energy storage device discharge selection system 126 logic, part of the energy storage device discharge selection system 126 that is manifested in the operating system 108 is responsible for dictating policies to the part of the energy storage device discharge selection system 126 manifested inside the PMIC 402.

Thus, as represented in FIG. 4, the operating system 108, by way of an energy storage device discharge selection system 126 or otherwise, may make policy decisions such as mode selection and energy storage device constraints setting for energy storage device switching. Policy decisions are made based upon performance parameters indicative of an operational context including at least information regarding battery states and characteristics obtained from the battery controller 204. The API 406 provides a mechanism by which control signals are communicated to the energy storage device controller 204 to set the registers 404 in accordance with the policy decisions. Thus, the operating system 108 and/or energy storage device discharge selection system 126 may direct operation of energy storage device controller 204 to implement policy enforcement of a selected policy by setting the registers 404 and causing operation of switching hardware 206 to effectuate the modes and energy storage device constraints specified by the policy. Power is then supplied to the system via one or more of the energy storage devices in accordance with the policy decisions.

It should be noted that although various different values, labels, levels, and so forth are discussed herein, these are examples and the techniques discussed herein are not limited to these examples. For example, any specific threshold values and/or labels discussed herein are only examples, and various other threshold values and/or labels can additionally or alternatively be used. These examples are illustrations only and are not intended to limit the scope of the techniques discussed herein.

Example Procedures

Figure 5:
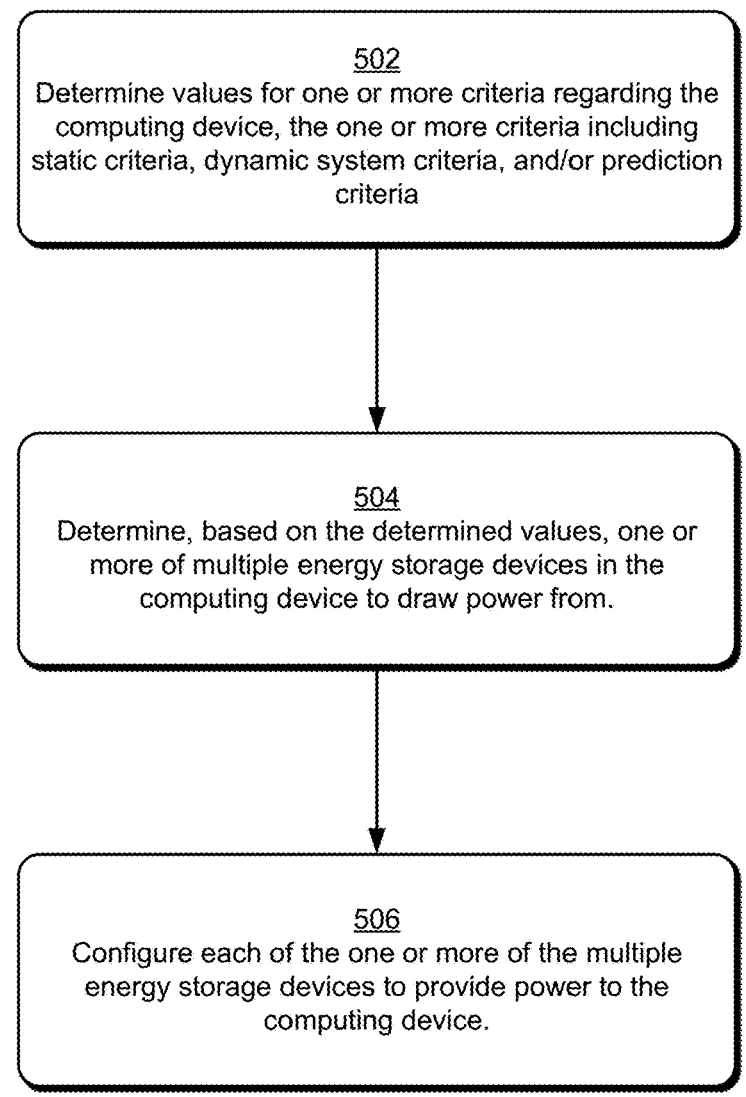
FIG. 5 is a flow diagram that describes details of an example procedure for dynamic energy storage device discharging in accordance with one or more implementations.

Further aspects of the dynamic energy storage device discharging techniques are discussed in relation to example procedure of FIG. 5. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks.

FIG. 5 is a flow diagram that describes details of an example procedure 500 for dynamic energy storage device discharging in accordance with one or more implementations. The procedure 500 describes details of drawing power from multiple energy storage devices. The procedure 500 can be implemented by way of a suitably configured computing device, such as by way of an operating system 108, energy storage device discharge selection system 126, and/or other functionality described in relation to the examples of FIGS. 1-4.

Values for one or more criteria regarding the computing device are determined (block 502). The one or more criteria can be static criteria, dynamic system criteria, and/or prediction criteria. By way of example, the values can be the temperatures of each of multiple thermal zones in a computing device.

One or more of multiple energy storage devices in the computing device to draw power from are determined based on the determined values (block 504). Power can be drawn from a single energy storage device, or alternatively from multiple energy storage devices.

Each of the one or more energy storage devices is configured to provide power to the computing device (block 506). Energy is drawn from the one or more energy storage devices based on their configuration.

Example System

Figure 6:
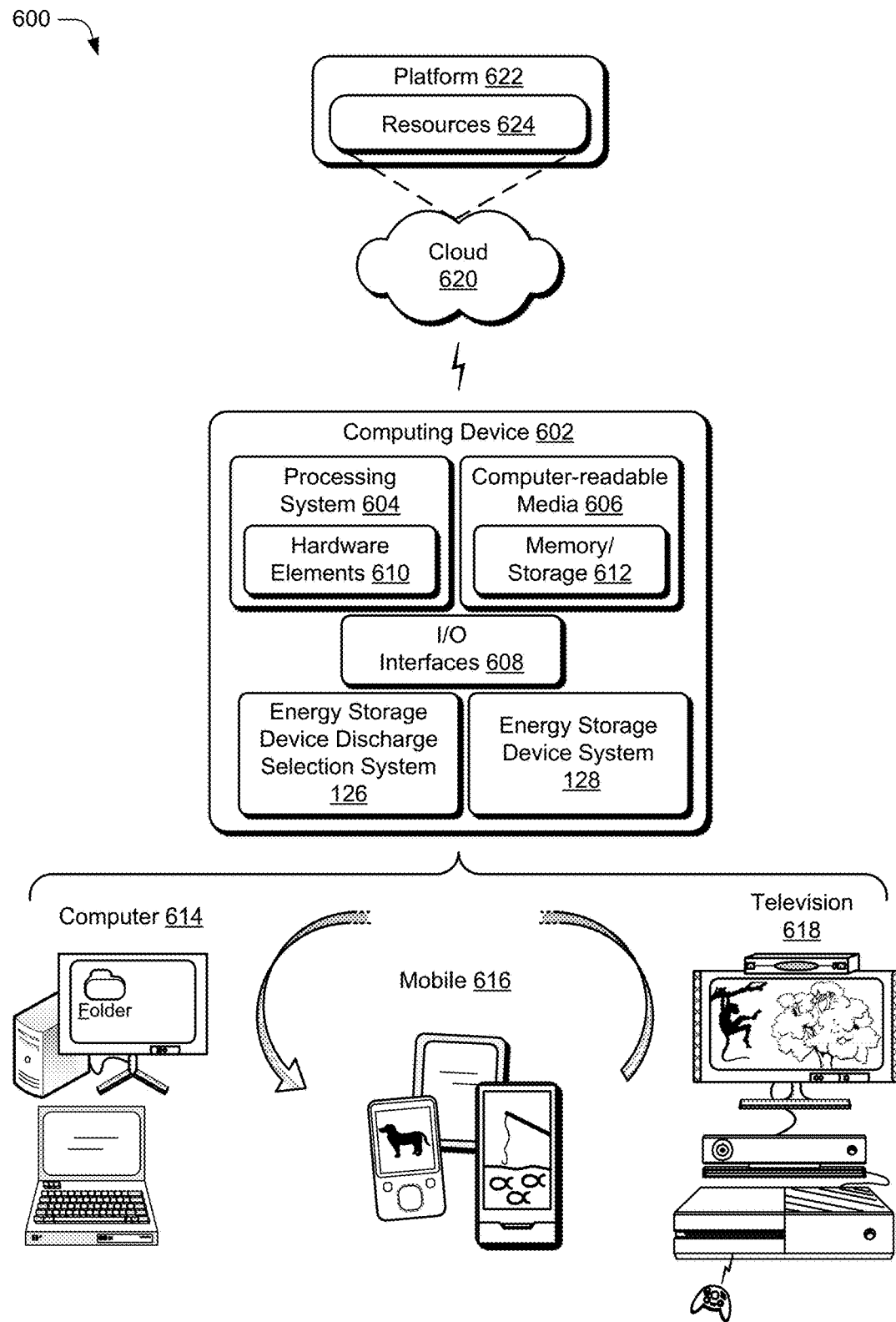
FIG. 6 illustrates an example system that includes an example computing device that is representative of one or more computing systems and/or devices that may implement the various techniques described herein.

FIG. 6 illustrates an example system 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 602, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, energy storage device discharge selection system 126, and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This is illustrated through inclusion of the energy storage device discharge selection system 126 and the energy storage device system 128 on the computing device 602. The functionality represented by energy storage device discharge selection system 126 and other modules/applications may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device having multiple energy storage devices, the method comprising: determining, for each of multiple thermal zones of the computing device, a temperature of the thermal zone; determining, based on multiple criteria regarding operation of the computing device, one or more of the multiple energy storage devices to draw power from, the multiple criteria including the temperature of each of the one or more thermal zones; and configuring each of the one or more of the multiple energy storage devices to provide power to the computing device.

Alternatively or in addition to any of the above described methods, any one or combination of: wherein the determining one or more of the multiple energy storage devices to draw power from comprises determining to draw power from one of the multiple energy storage devices that is not in a thermally hot zone; wherein the multiple criteria includes dynamic system criteria, the dynamic system criteria includes for each of the multiple energy storage devices an indication of a thermal zone in which the energy storage device is located, and the determining one or more of the multiple energy storage devices to draw power from comprises duty cycling ones of the multiple energy storage devices in different thermal zones; wherein the multiple criteria includes dynamic system criteria, the dynamic system criteria includes an indication of whether the computing device is under a high power load, and the determining one or more of the multiple energy storage devices to draw power from comprises selecting at least two of the multiple energy storage devices in response to determining that the computing device is under a high power load; wherein the multiple criteria includes static criteria, the static criteria includes electrical proximity of a component in the computing device to each of the multiple energy storage devices, and the determining one or more of the multiple energy storage devices to draw power from comprises determining to draw power from the one of the multiple energy storage devices being most energy efficient for the component; wherein the multiple criteria includes static and/or dynamic criteria, the static and/or dynamic criteria includes an energy storage device charge level, and the determining one or more of the multiple energy storage devices to draw power from comprises determining to draw power from one of the multiple energy storage devices that satisfies a threshold charge level for the energy storage device; wherein the multiple criteria include energy storage device presence predictions, and the determining one or more of the multiple energy storage devices to draw power from comprises determining to draw power from a particular one of the multiple energy storage devices in response to predicting that the one energy storage device will be removed from the computing device within a threshold amount of time and/or energy and the other ones of the multiple energy storage devices are not able to provide power to the computing device for a duration of time that the computing device is predicted to run in the absence of an additional power source; wherein the multiple criteria include power source connection predictions, and the determining one or more of the multiple energy storage devices to draw power from comprises determining to draw power from the multiple energy storage devices in a balanced manner based on the power source connection predictions; wherein the multiple criteria include expected future workload and/or energy usage predictions, and the determining one or more of the multiple energy storage devices to draw power from comprises determining to draw power from the multiple energy storage devices in a balanced manner in response to predicting that there is sufficient charge in the energy storage devices to perform the expected future workload and/or energy usage of the computing device; wherein each of the energy storage devices comprises a battery; wherein the determining one or more of the multiple energy storage devices to draw power from further comprises reducing performance of a hardware component and/or software component of the computing device; wherein the determining one or more of the multiple energy storage devices to draw power from comprises determining the one or more of the multiple energy storage devices using battery age balancing.

A method implemented in a computing device having multiple energy storage devices, the method comprising: determining values for multiple criteria regarding the computing device, the multiple criteria including hardware characteristics of the computing device, the hardware characteristics of the computing device including electrical proximity of each of the multiple energy storage devices to a component of the computing device; determining, based on the multiple criteria, one or more of the multiple energy storage devices to draw power from, the determining the one or more energy storage devices including identifying one of the multiple energy storage devices that is most energy efficient for the component; and configuring each of the one or more of the multiple energy storage devices to provide power to the computing device, the configuring including configuring the one of the multiple energy storage devices that is closest to the component to provide power to the component.

Alternatively or in addition to any of the above described methods, any one or combination of: the method further comprising the values for the multiple criteria including dynamic system criteria, the dynamic system criteria including a temperature of each of multiple thermal zones of the computing device, and the determining the one or more energy storage devices including determining the one or more of the multiple energy storage devices to draw power from based at least in part on the temperatures of each of the multiple thermal zones; wherein the multiple criteria includes for each of the multiple energy storage devices an indication of a thermal zone in which the energy storage device is located, and the determining one or more of the multiple energy storage devices to draw power from comprises duty cycling ones of the multiple energy storage devices in different thermal zones; wherein the multiple criteria includes an indication of whether the computing device is under a high power load, and the determining one or more of the multiple energy storage devices to draw power from comprises selecting at least two of the multiple energy storage devices in response to determining that the computing device is under a high power load; wherein the multiple criteria include energy storage device presence predictions, and the determining one or more of the multiple energy storage devices to draw power from comprises determining to draw power from a particular one of the multiple energy storage devices in response to predicting that the one energy storage device will be removed from the computing device within a threshold amount of time and the other ones of the multiple energy storage devices are not able to provide power to the computing device for a duration of time that the one energy storage device is not present at the computing device and power cannot be replenished to the multiple energy storage devices.

A computing device comprising: an energy storage device system including multiple energy storage devices; and an energy storage device discharge selection system configured to communicate, to the energy storage device system, an indication of which of the multiple energy storage devices to draw power from, the energy storage device discharge selection system including: a static criteria determination module configured to determine values for characteristics of the multiple energy storage devices and physical characteristics of the computing device; a dynamic system criteria determination module configured to determine values for characteristics of the energy storage devices and/or the computing device that change while the computing device operates, including temperatures of one or more thermal zones in the computing device; and an energy storage device selection module configured to select, based on the values determined by the static criteria determination module and the dynamic system criteria determination module, which of the multiple energy storage devices to draw power from.

Alternatively or in addition to any of the above described computing devices, any one or combination of: the energy storage device discharge selection system further including a prediction module configured to determine values for characteristics of predicted behavior or usage of the computing device, and the energy storage device selection module being further configured to select, based at least in part on the values determined by the prediction module, which of the multiple energy storage devices to draw power from; the dynamic energy storage device discharge selection system further including a prediction module configured to determine values for characteristics of estimated or predicted energy consumption by the computing device, and the energy storage device selection module being further configured to select, based at least in part on the values determined by the prediction module, which of the multiple energy storage devices to draw power from.

CONCLUSION

Although the example implementations have been described in language specific to structural features and/or methodological acts, it is to be understood that the implementations defined in the appended claims are not necessarily limited to the specific features or acts described. Rather, the specific features and acts are disclosed as example forms of implementing the claimed features.

What is claimed is:

1. A method implemented in a computing device having multiple energy storage devices, the method comprising:
    determining, for each of multiple thermal zones of the computing device, respective temperatures of the thermal zones, wherein the temperatures comprise temperatures of the thermal zones and not temperatures of the energy storage devices, wherein each thermal zone contains a respective power-drawing component of the computing device and a respective energy storage device, and wherein the temperatures of the thermal zones are determined according to temperature measurements obtained from components of the computing device other than the energy storage devices, and wherein storage of the computing device stores indications of which components are in which thermal zones and stores the temperatures of the respective thermal zones;
    determining, based on multiple criteria regarding operation of the computing device, which of the multiple energy storage devices to draw power from, the multiple criteria including the temperatures of the respective thermal zones; and
    configuring, according to the determining, each of the one or more of the multiple energy storage devices.

2. The method as recited in claim 1, wherein the determining comprises determining to draw power from one of the multiple energy storage devices that is not in a thermally hot zone.

3. The method as recited in claim 1, wherein the multiple criteria includes dynamic system criteria, the dynamic system criteria includes for each of the multiple energy storage devices an indication of a thermal zone in which the energy storage device is located, and the determining comprises duty cycling the multiple energy storage devices in different thermal zones.

4. The method as recited in claim 1, wherein the multiple criteria includes dynamic system criteria, the dynamic system criteria includes an indication of whether the computing device is under a power load that exceeds a threshold, and the determining comprises selecting at least two of the energy storage devices in response to determining that the computing device is under a power load that exceeds a threshold.

5. The method as recited in claim 1, wherein the multiple criteria includes static criteria, the static criteria includes electrical proximity of a component in the computing device to each of the multiple energy storage devices, and the determining comprises determining to draw power from the one of the multiple energy storage devices being most energy efficient for the component relative to the other energy storage devices.

6. The method as recited in claim 1, wherein the multiple criteria includes static criteria, the static criteria includes an energy storage device charge level, and the determining one or more of the multiple energy storage devices to draw power from comprises determining to draw power from one of the multiple energy storage devices that satisfies a threshold charge level for the energy storage device.

7. The method as recited in claim 1, wherein the determining comprises determining to draw power from a particular one of the multiple energy storage devices in response to predicting that the one energy storage device will be removed from the computing device within a threshold amount of time and/or energy and the other ones of the multiple energy storage devices are not able to provide power to the computing device for a duration of time that the computing device is predicted to run in the absence of an additional power source.

8. The method as recited in claim 1, wherein the multiple criteria include power source connection predictions, and the determining comprises determining to draw power from the multiple energy storage devices in a balanced manner based on the power source connection predictions.

9. The method as recited in claim 1, wherein the multiple criteria include expected future workload and/or energy usage predictions, and the determining comprises determining to draw power from the multiple energy storage devices in a balanced manner in response to predicting that there is sufficient charge in the energy storage devices to perform the expected future workload and/or energy usage of the computing device.

10. The method as recited in claim 1, further comprising, according to the multiple criteria, reducing performance of a hardware component and/or software component of the computing device.

11. The method as recited in claim 1, wherein the determining comprises determining the one or more of the multiple energy storage devices using battery age balancing.

12. A method implemented in a computing device having multiple energy storage devices, the method comprising:
    determining values for multiple criteria regarding the computing device, the multiple criteria including hardware characteristics of the computing device, the hardware characteristics of the computing device including electrical proximity of each of the multiple energy storage devices to a component of the computing device;

determining, based on the multiple criteria, one or more of the multiple energy storage devices to draw power from, the determining the one or more energy storage devices including identifying one of the multiple energy storage devices that is most energy efficient for the component; and configuring each of the one or more of the multiple energy storage devices to provide power to the computing device, the configuring including configuring the one of the multiple energy storage devices that is determined to be closest to the component to provide power to the component.

13. The method as recited in claim 12, further comprising:
the values for the multiple criteria including dynamic system criteria, the dynamic system criteria including a temperature of each of multiple thermal zones of the computing device; and
the determining the one or more energy storage devices including determining the one or more of the multiple energy storage devices to draw power from based at least in part on the temperatures of each of the multiple thermal zones.

14. The method as recited in claim 12, wherein the multiple criteria includes for each of the multiple energy storage devices an indication of a thermal zone in which the energy storage device is located, and the determining one or more of the multiple energy storage devices to draw power from comprises duty cycling ones of the multiple energy storage devices in different thermal zones.

15. The method as recited in claim 12, wherein the multiple criteria includes an indication of whether the computing device is under a high power load, and the determining one or more of the multiple energy storage devices to draw power from comprises selecting at least two of the multiple energy storage devices in response to determining that the computing device is under a high power load.

16. The method as recited in claim 12, wherein the multiple criteria include energy storage device presence predictions, and the determining one or more of the multiple energy storage devices to draw power from comprises determining to draw power from a particular one of the multiple energy storage devices in response to predicting that the one energy storage device will be removed from the computing device within a threshold amount of time and the other ones of the multiple energy storage devices are not able to provide power to the computing device for a duration of time that the one energy storage device is not present at the computing device and power cannot be replenished to the multiple energy storage devices.

17. A method according to claim 12, wherein determining that the one of the multiple energy storage devices is closest to the component comprises determining that the one of the multiple energy devices is electrically closest to the component.

18. A computing device comprising:
an energy storage device system including multiple energy storage devices; and
an energy storage device discharge selection system configured to communicate, to the energy storage device system, an indication of which of the multiple energy storage devices to draw power from and/or how much power to draw from which of the energy storage devices, the energy storage device discharge selection system including:
a static criteria determination module configured to determine values for characteristics of the multiple energy storage devices and physical characteristics of the computing device;
a dynamic system criteria determination module configured to determine values for characteristics of the energy storage devices and/or the computing device that change while the computing device operates, including temperatures of one or more thermal zones in the computing device, wherein the temperatures comprise temperatures of the thermal zones and not temperatures of the energy storage devices, wherein each thermal zone contains a respective power-drawing component of the computing device and a respective energy storage device, wherein the temperatures of the thermal zones are determined according to temperature measurements obtained from components of the computing device other than the energy storage devices, and wherein storage of the computing device stores indications of which components are in which thermal zones and stores the temperatures of the respective thermal zones; and
an energy storage device selection module configured to determine, based on the values determined by the static criteria determination module and the dynamic system criteria determination module, how much power to draw from whichever of the multiple energy storage devices are being used to power the computing device.

19. The computing device as recited in claim 18, the energy storage device discharge selection system further including a prediction module configured to determine values for characteristics of predicted behavior or usage of the computing device, and the energy storage device selection module being further configured to select, based at least in part on the values determined by the prediction module, which of the multiple energy storage devices to draw power from.

20. The computing device as recited in claim 18, the dynamic energy storage device discharge selection system further including a prediction module configured to determine values for characteristics of estimated or predicted energy consumption by the computing device, and the energy storage device selection module being further configured to select, based at least in part on the values determined by the prediction module, which of the multiple energy storage devices to draw power from.

* * * * *